(12) United States Patent
Lapczyna et al.

(10) Patent No.: US 12,044,691 B2
(45) Date of Patent: Jul. 23, 2024

(54) MEASURING APPARATUS FOR A LIQUID HANDLING APPARATUS FOR MEASURING PIPETTING CONTAINER, ARTICLE FOR SAID MEASURING APPARATUS AND CORRESPONDING MEASURING METHOD

(71) Applicant: Eppendorf SE, Hamburg (DE)

(72) Inventors: Markus Lapczyna, Kaltenkirchen (DE); Uwe Dunker, Hamburg (DE); Burkhardt Reichmuth, Hamburg (DE); Maik Radke, Hamburg (DE)

(73) Assignee: Eppendorf SE, Hamburg (DE)

( * ) Notice: Subject to any disclaimer, the term of this patent is extended or adjusted under 35 U.S.C. 154(b) by 918 days.

(21) Appl. No.: 16/971,658

(22) PCT Filed: Feb. 27, 2019

(86) PCT No.: PCT/EP2019/054901
§ 371 (c)(1),
(2) Date: Aug. 20, 2020

(87) PCT Pub. No.: WO2019/166512
PCT Pub. Date: Sep. 6, 2019

(65) Prior Publication Data
US 2020/0408788 A1    Dec. 31, 2020

(30) Foreign Application Priority Data

Feb. 27, 2018 (EP) ..................... 18158943
Jun. 13, 2018 (EP) ..................... 18177610

(51) Int. Cl.
*G01N 35/10* (2006.01)
*B01L 3/02* (2006.01)
(Continued)

(52) U.S. Cl.
CPC ..... *G01N 35/1011* (2013.01); *G01N 35/0099* (2013.01); *B01L 3/021* (2013.01);
(Continued)

(58) Field of Classification Search
CPC ........ B01L 2200/025; B01L 2200/148; B01L 2300/0627; B01L 3/021; B01L 9/54;
(Continued)

(56) References Cited

U.S. PATENT DOCUMENTS 5,529,754 A * 6/1996 Bonacina ........... G01N 35/1011
324/519
6,081,338 A * 6/2000 Reimann ............ H05K 13/0812
356/634
(Continued)

FOREIGN PATENT DOCUMENTS

CN       106457250 A  *  2/2017  ............... B01L 3/02
DE   102008058065 A1  *  5/2010  ............. G01B 7/003
(Continued)

*Primary Examiner* — David L Singer
(74) *Attorney, Agent, or Firm* — Todd Lorenz

(57) ABSTRACT

A measuring apparatus usable in a liquid handling apparatus, and method, for detecting a deformed pipetting container using a first and a second measuring device, the measuring apparatus being configured to determine the position of an end region of the pipetting container as a function of a position of a measurement support section of the pipetting container as relative position data in a data storage device, so that subsequently the position of the end region of the pipetting container can be determined by measuring the position of the measurement support section and from the relative position data.

10 Claims, 12 Drawing Sheets

(51) Int. Cl.
    *B01L 9/00*     (2006.01)
    *G01N 35/00*    (2006.01)
    *G01N 35/04*    (2006.01)
(52) U.S. Cl.
    CPC ......... *B01L 9/54* (2013.01); *B01L 2200/025* (2013.01); *B01L 2200/148* (2013.01); *B01L 2300/0627* (2013.01); *G01N 2035/00811* (2013.01); *G01N 2035/0093* (2013.01); *G01N 2035/0494* (2013.01); *G01N 2035/1013* (2013.01); *G01N 2035/1048* (2013.01); *G05B 2219/50133* (2013.01)
(58) Field of Classification Search
    CPC . G01N 2035/00811; G01N 2035/0093; G01N 2035/0494; G01N 2035/1013; G01N 2035/1048; G01N 35/0099; G01N 35/1011; G05B 2219/50133
    See application file for complete search history.

(56) References Cited

U.S. PATENT DOCUMENTS

| | | | | |
|---|---|---|---|---|
| 10,041,963 B2* | 8/2018 | Ha | .................. | G01N 35/00594 |
| 11,073,530 B2* | 7/2021 | Müller | .................. | B01L 3/0237 |
| 11,360,107 B1* | 6/2022 | Young | .................. | G01N 35/1016 |
| 2010/0266454 A1* | 10/2010 | Reichmuth | .................. | B01L 3/0279 |
| | | | | 422/501 |
| 2011/0209564 A1* | 9/2011 | Von Beichmann | ....... | B01L 9/00 |
| | | | | 73/864.01 |
| 2012/0065912 A1* | 3/2012 | Corkan | .................. | B25J 9/1692 |
| | | | | 73/1.79 |
| 2013/0001242 A1* | 1/2013 | Hofstetter | ............. | F04B 7/0015 |
| | | | | 222/1 |
| 2013/0090878 A1* | 4/2013 | Somerville | ............. | G06F 15/00 |
| | | | | 702/95 |
| 2013/0239667 A1* | 9/2013 | Lohn | .................... | B01L 3/0217 |
| | | | | 73/864.16 |
| 2013/0280143 A1* | 10/2013 | Zucchelli | .............. | G01N 35/026 |
| | | | | 422/501 |
| 2014/0025202 A1* | 1/2014 | Umeno | .............. | G01N 35/0099 |
| | | | | 700/253 |
| 2014/0051182 A1* | 2/2014 | Reichmuth | ........... | B01L 3/0237 |
| | | | | 436/180 |
| 2015/0093786 A1* | 4/2015 | Thieme | ................... | B01L 1/025 |
| | | | | 435/91.2 |
| 2015/0114123 A1* | 4/2015 | Schaefer | ................ | G01S 15/04 |
| | | | | 494/20 |
| 2015/0125961 A1* | 5/2015 | Goemann-Thoss | .... | G16H 40/63 |
| | | | | 422/67 |
| 2019/0128905 A1* | 5/2019 | Ott | ..................... | G01N 35/00584 |
| 2020/0147601 A1* | 5/2020 | Briggs | ..................... | B01L 3/02 |

FOREIGN PATENT DOCUMENTS

| | | | | |
|---|---|---|---|---|
| DE | 102011114591 B3 * | 12/2012 | ............ | B01L 3/0217 |
| EP | 2687855 A1 | 1/2021 | | |
| JP | 2002168779 A * | 6/2002 | | |
| WO | WO-9902024 A1 * | 1/1999 | ......... | H05K 13/0812 |
| WO | WO 2012/004555 A1 | 1/2012 | | |
| WO | WO 2012/069925 A1 | 5/2012 | | |

\* cited by examiner

| 1: | measuring apparatus |
| 2: | holding device |
| 2b: | moving device |
| 3: | electronic control device |
| 4: | processor device |
| 5: | data storage device |
| 6: | base plate |
| 7: | carrier device |
| 10: | first measuring device |
| 20: | second measuring device |
| 50: | pipetting container |

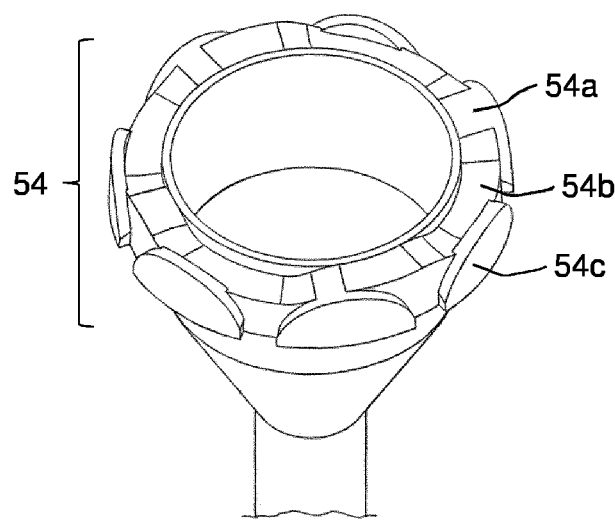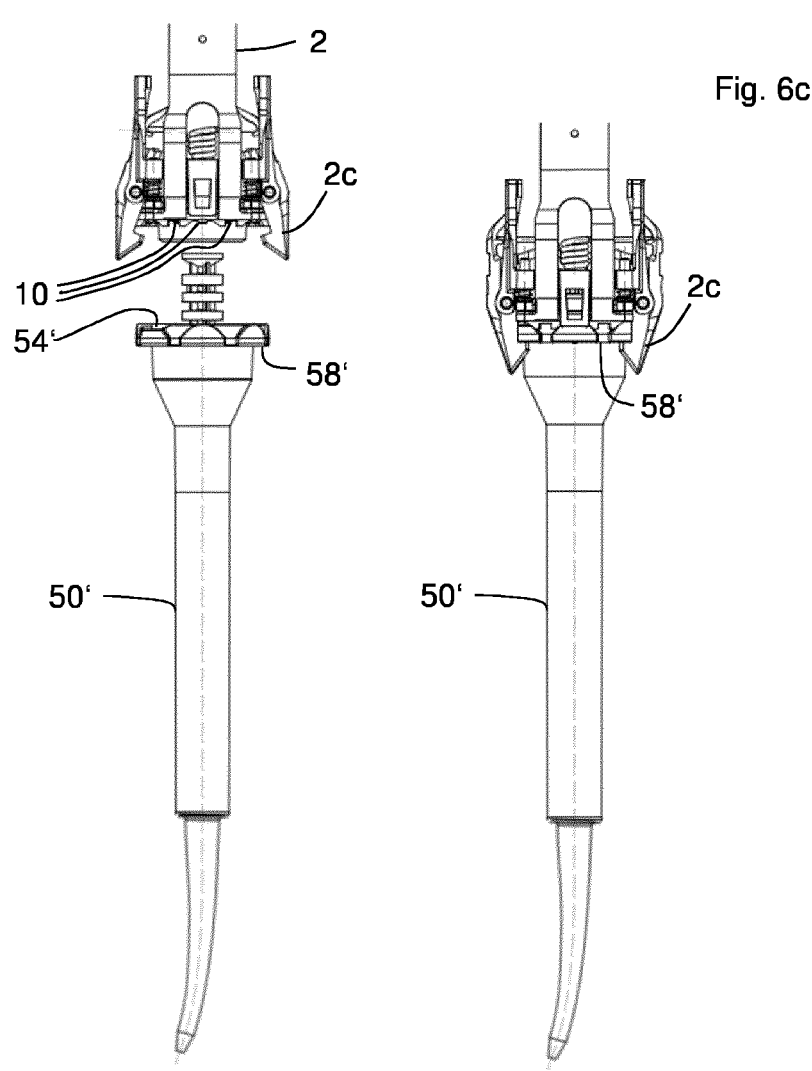

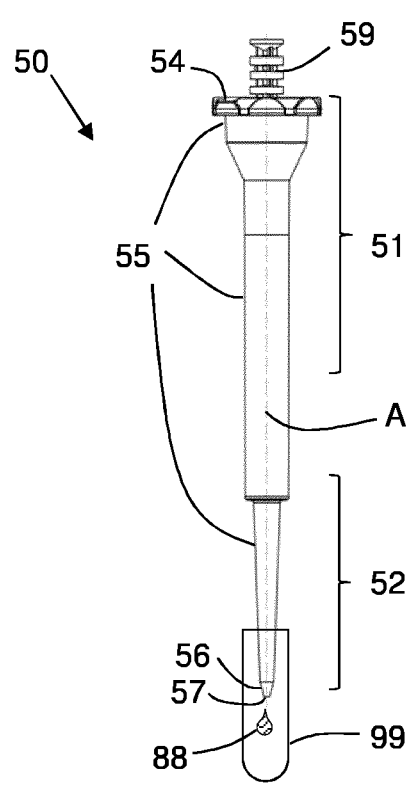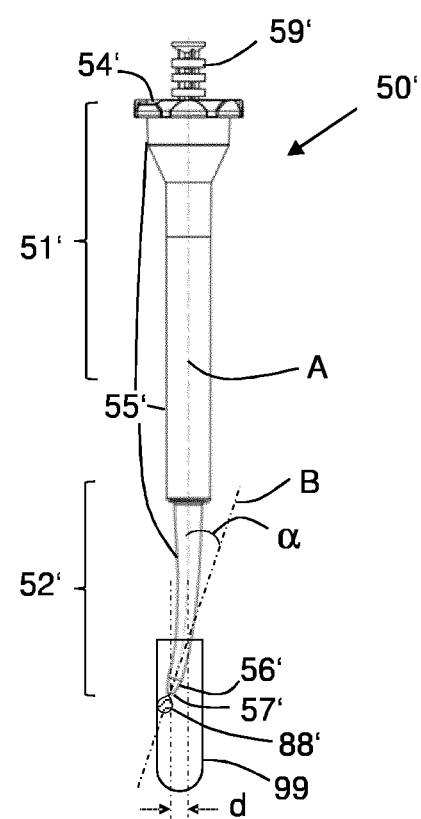

Fig. 9

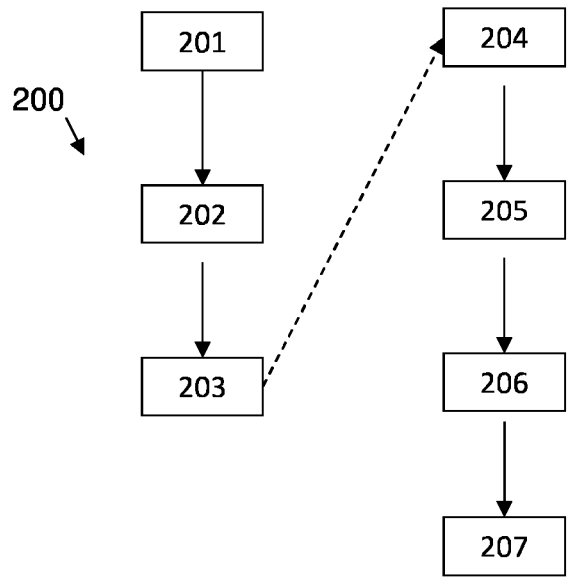

| 200: | Method for detecting the relative position of an end region of an object |
|---|---|
| 201: | Measuring a position of a section of the object arranged on a holding device by means of a by means of a first measuring device |
| 202: | Measuring a position of an end region of the object placed on the holding device by means of a second measuring device |
| 203: | Saving the position of the end region as a function of the position of the section as relative position data in a data storage device |
| 204: | Placing the measured object in a storage position |
| 205: | Grasping the measured object from the storage position and connecting the object to the holding device in a current position which deviates from the position of the object when it was measured |
| 206: | Measuring the current position of the measured object by measuring the position of its measuring support section relative to the holding device |
| 207: | Determining the position of the end region of the measured object from the current position of its measurement support section and from the stored relative position data |

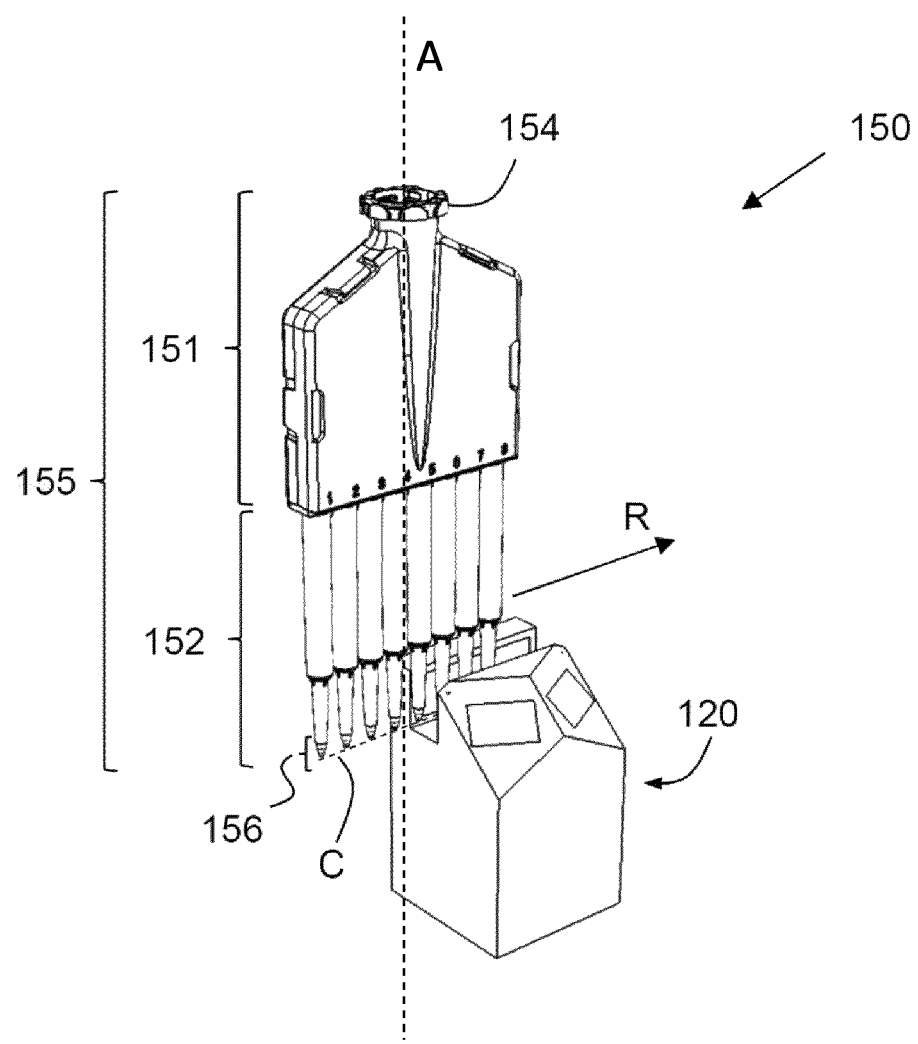

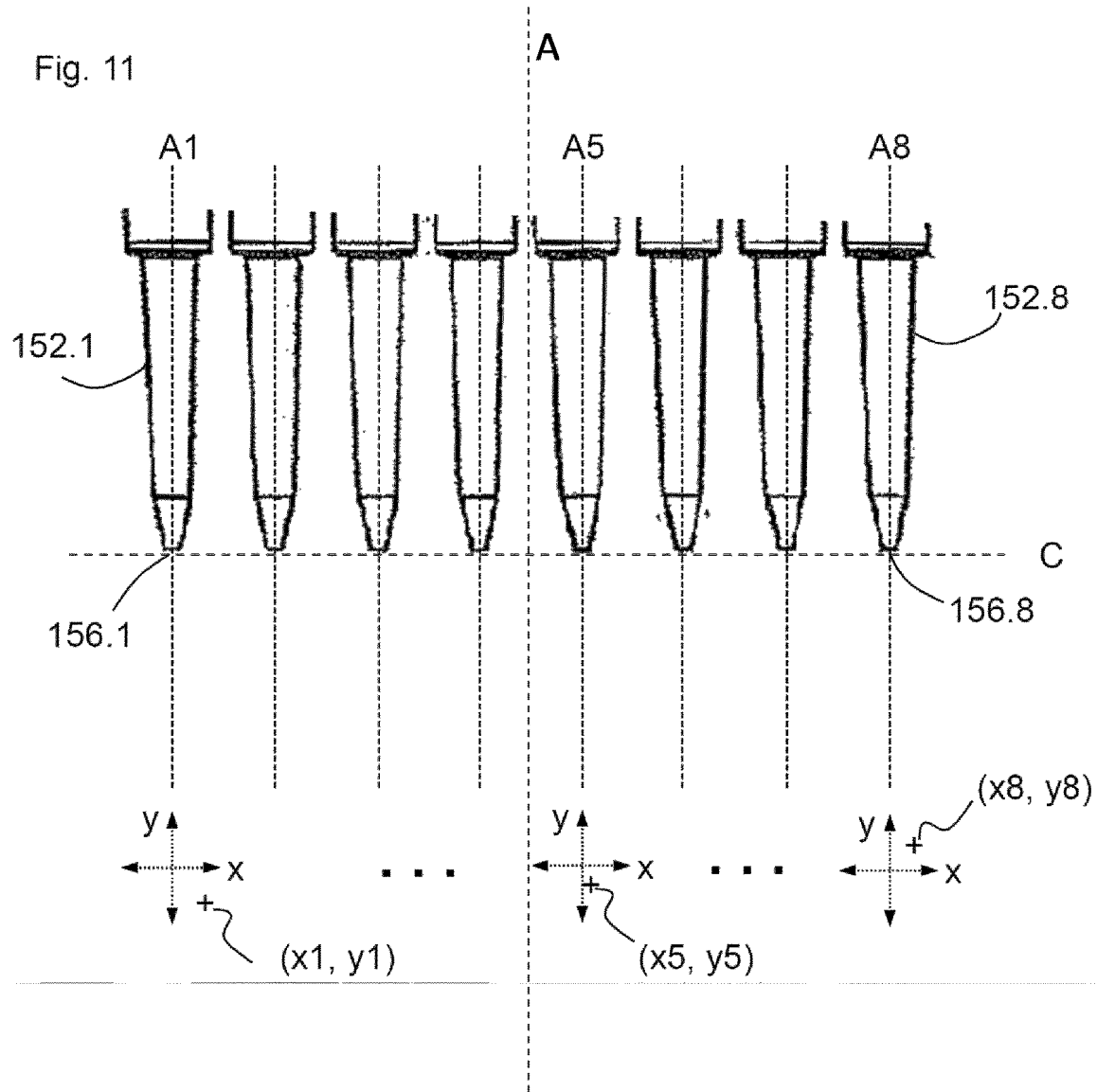

MEASURING APPARATUS FOR A LIQUID HANDLING APPARATUS FOR MEASURING PIPETTING CONTAINER, ARTICLE FOR SAID MEASURING APPARATUS AND CORRESPONDING MEASURING METHOD

The invention relates to a measuring apparatus for a laboratory automat for measuring an object which can be moved automatically by the laboratory automat, in particular a pipetting container. It also concerns the object which can be moved automatically by the laboratory apparatus for use in this measuring apparatus, in particular the pipetting container for use in this measuring apparatus, and a corresponding measuring method. Such a measuring apparatus may in particular be part of a laboratory automat.

Laboratory automats are used to process samples, especially liquid samples, with high efficiency in chemical, biological, biochemical, medical or forensic laboratories. They are also known as "liquid handling" machines. Laboratory automat automate treatment steps that would otherwise have to be performed manually, thereby increasing the speed, precision and reliability of these treatments.

Treatment of a liquid laboratory sample may be directed towards changing the physical, chemical, biochemical or other composition of the sample. By treating the sample, a sample can, for example, be divided or diluted. The constituents of a sample can be analyzed, or new constituents can be produced, e.g. by a chemical reaction, in particular using the sample. Particularly in connection with the processing and analysis of DNA or RNA or their components, laboratory automats are useful for obtaining a wealth of information within a suitable period of time or for analyzing a plurality of such samples.

Laboratory automats usually have a work surface with workstations thereon, where samples can be processed or stored in various ways. For the transport of e.g. liquid samples between different positions, in particular sample containers, a program-controlled movement device is usually used in connection with a fluid transfer device, which may comprise a pipetting system, for example. Both the transport of the samples and their treatment at the various stations can be automated under program control.

Particularly desired is the greatest possible precision in the automated dosing of laboratory samples. When taking up a liquid sample during a program-controlled process in the laboratory automat, laboratory samples are first sucked into the pipetting container at a first workstation. The filled pipetting container is transported to the desired target position where the laboratory sample is dispensed at the specified dispensing volume. When dispensing occurs according to the free jet method, the fluid sample leaves the pipetting container as a jet or as a free drop. For wall dispensing, the dispensing volume is stripped off the inner wall of a sample container.

Successful delivery of the delivery volume requires precise positioning of the pipetting container relative to the sample container. This is especially true for a high surface density of sample chambers arranged side by side, as it is the case with microtiter plates. The higher the surface density, the smaller the opening diameters of the sample chambers, and the higher the requirements for positioning accuracy. A particularly high positioning accuracy is also required for wall dispensing.

Most known pipetting devices use conventional pipetting containers which are essentially rotationally symmetrical to an axis, so that the first and second end portion are arranged coaxially. When arranged vertically, such pipetting containers release in a free jet the sample vertically downwards. For wall dispensing, it is known to bring the pipetting container into an inclined position by tilting its holding device, which makes it easier to wipe off the dispensing volume on the inner wall of the sample container.

Depending on the geometry and material of the pipetting container, it can happen that pipetting containers are more or less deformed either already during production or as a result of storage and environmental influences. This can result in the fluid exchange opening of the pipetting container to be no longer coaxially arranged, so that the pipetting container is no longer easily usable for precise liquid delivery and must be discarded. In many applications that handle very valuable samples, it is also particularly desirable to verify that the pipetting container is in the correct or appropriate condition before—or during—use.

According to the document U.S. Pat. No. 9,678,094 B2 it is possible to check the geometry of pipette needles obligatorily by measurement, in order to adjust if necessary, the position of the pipette needle holder to take into account a bend of the pipette needle. However, since a single geometry measurement of a pipetting container is relatively costly, the above approach leads to a significant delay in the work processes in a laboratory automat.

Not only the position of pipetting containers should be clearly defined in laboratory automats, in general the position of all movable objects that are controlled and moved by the laboratory automat in automated processes should be exactly detectable and defined. For example, a rod element can be carried by the automatically movable tool head of a laboratory automat, which is to be used to align other objects in the working area of the laboratory automat and whose alignment should therefore be exactly definable. Furthermore, a pipetting container can also be used to align other objects in the working area of the laboratory automat. EP 2 934 821 A1 describes an automated alignment system of a laboratory robot, in which a laser measuring tool is gripped by a robot arm, which must be aligned, and the robot arm is aligned by laser measurement on markings of the working environment.

It is an object of the present invention is to provide a solution for the cost-efficient, reliable and precise automated operation of a laboratory automat.

The invention solves the problem in particular by a measuring apparatus according to the present disclosure, the object usable by this measuring apparatus, in particular a pipetting container, according to the present disclosure and the method according to the present disclosure. The invention is further definable by a system comprising a measuring apparatus and a pipetting container.

The solution according to the invention comprises a measuring apparatus for detecting the relative position of an end portion of an object, in particular a pipetting container having a measurement support section.

The measuring apparatus preferably comprises:
a holding device for holding an object, in particular a pipetting container which serves to receive a fluid laboratory sample by means of suction into the pipetting container and/or to deliver the fluid laboratory sample, which comprises an object body, in particular a tubular container body, having a first end portion and a second end portion, wherein the first end portion is arranged for connecting the object, in particular the pipetting container, to the holding device and comprises a measurement support section, and wherein the second end portion comprises an end region, in particular a mouth region with a fluid exchange opening, an electronic control device with processor means for data processing and with data storage means for storing data wherein the measuring apparatus comprises a first measuring device which is configured to measure a position, in particular a rotational position, of the measurement support section of the object, in particular of the pipetting container, on the holding device, and has a second measuring device which is arranged to measure the position of the end region of the object, in particular of the mouth region of a pipetting container, and wherein the measuring apparatus is arranged to store the position of the end region, in particular of the mouth region, as a function of the position of the measurement support section as relative position data in the data storage device, so that subsequently the position of the end region of the object, in particular of the mouth region of the pipetting container, can be determined from measuring the position of the measurement support section and from the relative position data.

The measuring apparatus according to the invention makes use of the special design of the object, in particular of the pipetting container, according to which the position of the object, in particular of the pipetting container on the holding device can be clearly determined from the measurement of the measurement support section. Since such a position measurement (first measurement) is easier to realize in practice than a geometry measurement (second measurement), it requires less effort to implement a repeated position measurement into the workflow of an automated sample handling, than a repeated geometry measurement. The geometry measurement is required only once, in order to determine the relative position of the end region, in particular of the mouth region, with the fluid exchange opening or with the second end section, in relation to the position of the object, in particular of the pipetting container. The position of the end region is, in particular, the relative position of the end region with respect to a position of the measurement support section. If the accordingly measured object, in particular pipetting containers, is subsequently reused, a simple position measurement as well as the available information on the relative position, can be used to determine the absolute position of the end region, in particular of the fluid exchange opening or of the second end section, in relation to the holding device or to other reference points. It should be noted that when the measuring apparatus is used in an laboratory automat, the information about the individual deposition of a pipetting container can be stored in the data memory, so that even after the object, in particular the pipetting container, has been deposited in the meantime, it can be controlled again in a targeted manner and connected to the holding device and the desired information about the position of the end region is obtained by means of the simple position measurement in combination with the relative position data stored for this object, in particular for the pipetting container.

A position measurement is particularly easy to implement because the object to be measured, in particular pipetting containers, is connected to the holding device at the first end portion where the measurement support section is also located. The first measuring device can therefore be realized especially as part of the holding device. In contrast, the second end portion with the end region or mouth region is located at a greater distance from the holding device than the first end portion and, in the case of a pipetting container, should not be contacted if possible in order to guarantee the sterility of the pipetting container.

The invention is explained below in various passages for the preferred embodiment of the invention, wherein the object used and measured by the measuring apparatus is a pipetting container. However, it is also preferable that this object is another object that can be moved automatically, in particular by the laboratory automat in its working area and is configured for use with the measuring apparatus. For example, the object may be or comprises a rod element that is to be used, for example, to align other objects in the working area of the laboratory automat and whose alignment should therefore be precisely definable.

The measuring apparatus may be an apparatus that can be operated independently of a laboratory automat but is preferably built into the laboratory automat or can be installed in the laboratory automat by the manufacturer as an optional accessory.

The measuring apparatus has, in particular an interface for data transmission, via which data can be exchanged with the electrical control device of the laboratory automat, which in particular also controls the automated handling of the laboratory sample(s). Measurement data from the first and/or second measuring device can thus be exchanged.

This concerns in particular data (also called position data) with information about the position of the pipetting container measured by the first measuring device in relation to the holding device. For example, a coordinate system used by the electronic control unit may be fixed to the holding device, such that this coordinate system may move with the holding device. In the case of an laboratory automat equipped with the measuring apparatus, the coordinate system may also be fixed to the working area of the laboratory automat if the electrical control device knows the exact relative position of the movable holding device, which usually is the case.

Between the measuring device and the control device of the laboratory automat additionally such data (also referred to as position data) with information on the position of the mouth region of the pipetting container measured by the second measuring device can be exchanged, which are stored depending on the position data measured or still to be measured. The relative position data can be determined and stored by the measuring apparatus, or the control device of the laboratory automat (or another suitable device, e.g. a computer) receives the position data and the position data from the measuring apparatus and determines the relative position data from them and stores them. In particular, the position data were measured in such a way that the position of the pipetting container or of the measurement support section, which is immovably connected to the pipetting container, is unchanged during the measurement or has been changed in a predetermined and therefore traceable way.

The first measuring device is configured to measure a position, in particular a rotational position, of the measurement support section of the pipetting container on the holding device. The significance of the measurement support section is, that it actually enables a clear detection of a position change of the pipetting container. Conventional pipetting containers have a first end portion that is completely rotationally symmetrical to the longitudinal axis of the pipetting container or the entire pipetting container is usually rotationally symmetric. If one relies on the fact that a rotationally symmetrical pipetting container lies reliably against the holding device in the axial direction, the rotational position cannot be determined because of the rotational symmetry. Like any object, a rotationally symmetrical pipetting container has an individual orientation or rotational position after each change of position, however, this cannot be detected with a rotationally symmetrical object. The measurement support section serves to break the rotational symmetry and in particular serves to enable a clear determination of the position of the pipetting container in relation to a fixed coordinate system, which can be fixed in particular to the holding device or to the working area of a measuring apparatus or of a laboratory container.

The measurement support section and the first measuring device can be set up in such a way that only the rotational position of the pipetting container around its longitudinal axis at the holding device is determined. The other degrees of freedom of the pipetting container on the holding device are assumed to be correctly determined—in particular, it is assumed that the pipetting container rests horizontally in a predetermined manner on a contact area of the holding device and that the longitudinal axis is located at the predetermined position. This is achieved, for example, by a connecting section of the pipetting container, e.g. a flange running around the container body, which suitably matches with an appropriate connecting section of the holding device, e.g. a locking device.

The measurement support section and the first measuring device can be configured such that the complete position of the pipetting container on the holding device is determined, i.e. that the complete spatial position of the pipetting container can be determined from the design of the measurement support section. In this way, positional deviations of the pipetting container beyond the rotary position on the holding device can also be detected.

The measurement support section can be a mechanically scannable height profile, which is arranged at the first end portion of the pipetting container and which has a height variation in the direction of the longitudinal axis, which in particular can run concentrically around the longitudinal axis. The rotational position of the pipetting container can be in particular be determined, if the height profile has, with respect to the longitudinal axis, no rotationally symmetrical shape repetitions, e.g. a sinusoidal profile running continuously concentrically around the longitudinal axis. The measurement can then be carried out by recording the height profile with a scanning sensor integrated in the holding device, which can then form part of the first measuring device. The height profile can be manufactured integrally with the pipetting container, in particular by injection molding.

The measurement support section may also have at least one optically detectable marking, which can be evaluated by measuring a reflection intensity, according to the light barrier principle, by a color measurement or by an imaging measurement of the first measuring device.

The measurement support section may also have at least one electrically conductive section that can be detected, e.g. by a capacitive measurement of the first measuring device.

The second measuring device is configured to measure the position of the mouth region of the pipetting container. The second measuring device is preferably configured to measure the position of the mouth region without mechanical contact with the pipetting container, i.e. without contact. This prevents contamination of the mouth region, which is important for use in a laboratory automat. For the non-contact measurement, mainly an optical measurement comes into consideration, but also a measurement by means of capacitive measurement, or ultrasonic measurement can be considered.

Preferably the second measuring device comprises at least one light source and at least one optical sensor arranged or capable of being arranged to measure the position of the mouth region. In particular, such components of the second measuring device and the pipetting container may be arranged to perform a predetermined relative movement. In this way, the space, which contains the pipetting container, can be optically scanned to determine the position of the mouth region.

In a preferred embodiment, a second measuring device comprises a light source, in particular an LED, in particular an infrared LED, which provides the light to illuminate the portion of the space which, for the purpose of measurement, contains the second end portion or the mouth region of the pipetting container at least temporarily. Preferably, the light is directed uniformly onto this area of space, in particular, by irradiation with collimated light. This is guided, in particular by means of beam guidance measures, e.g. lens(es), mirror(s) etc., in such a way that it passes through the portion of the space from two directions and then falls on at least one optical sensor. This can be, in particular, a line sensor, in particular a CMOS line sensor. In order to determine the position of the mouth region by means of the line sensor, the control device evaluates the spatially resolved detected variation in shading, which results from the second end portion being moved with a predetermined movement in the space portion—in particular at constant speed—in a predetermined direction—in particular in the direction of the longitudinal axis of the first end portion or in a vertical direction. Since the light passes through the space portion from two directions, there are initially two separate shadows when the pipetting container is placed in the space portion. If the pipetting container is moved out of the space portion, the position of the shadows on the line sensor changes, from which, in combination with the known measuring geometry, the position of the mouth region with the reference point at the holding device can be deduced using conventional considerations of projection and coordinate transformation. Such a solution is particularly efficient if the holding device is anyway configured as a movable component of a laboratory automat.

The second measuring device is preferably configured to perform at least one optical measurement from two different directions each. This optical measurement may, in particular, provide the acquisition of an image of the mouth region. For this purpose, the second measuring device may comprise one or two image sensors, or additional image sensors. The image sensors are preferably arranged parallel to the longitudinal axis of the first end portion of the pipetting container.

The second measuring device and the holding device are preferably arranged movably to each other. This in particular allows a pipetting container, which is connected to the holding device, to be positioned on the second measuring device as required in order to perform the position measurement. If the measuring apparatus is stationary in the working area of a laboratory automat, the holding device can be moved to the position of the measuring apparatus to perform the position measurement.

The time required for this can be optimally reduced if the second measuring device is, in a preferred embodiment, movably arranged on the holding device. Also, in this case, the second measuring device can be moved to the pipetting container if necessary, but the required distance of the movement is shortened. If the holding device is moved, the second measuring device is moved in the same way, so that the distance does not depend—as mentioned in the first case—on the position of the holding device in the working area.

The invention also relates to the object usable by the measuring apparatus according to the invention, which is, in particular a pipetting container for receiving and/or dispensing a fluid laboratory sample. This object specifically interacts with the measuring apparatus according to the invention, at least via the measurement support section.

The object of the invention, in particular a pipetting container, comprises an object body, in particular a tubular container body, which comprises a first and a second end portion, the first end portion being set up for connecting the object, in particular a pipetting container, to the holding device of the measuring apparatus according to the invention and comprises a measurement support section, at least a portion of the object body, in particular of the tubular container body, extending along a longitudinal axis A, in particular the first end portion extends along this longitudinal axis A, wherein the first end portion comprises a measurement support section, which is configured, such that its position measurement with respect to this holding device allows to determine the position of the object, in particular of the pipetting container, with respect to this holding device, and wherein the second end portion comprises an end region, in particular, a mouth region with a fluid exchange opening, which is arranged in a relative position to this measurement support section.

In a first preferred embodiment, the object, in particular a pipetting container, is shaped such that the longitudinal axis runs centrally through the second end portion and the end region or the mouth region and that, in particular, the first and second end portions are coaxially arranged. Such a pipetting container is particularly suitable for sample delivery according to the free jet principle, especially in the vertical downward direction, i.e. in the direction of gravity.

In a second preferred embodiment, the object, in particular pipetting containers, is shaped such that the mouth region is located at a perpendicular distance d>0 to the longitudinal axis. This offset d>0 makes such a pipetting container particularly suitable for wall dispensing of the sample, whereby the exact choice of d depends on the desired use of the pipetting container, in particular, on the diameter of the sample container on which wall dispensing is to take place. In this case, the mouth area is in particular arranged, such that a longitudinal axis runs through the fluid exchange opening and the mouth region, in particular, also through the entire second end portion, in an oblique vertical downward direction, i.e. at an angle α>0° to the longitudinal axis, preferably 0°<α<80°, preferably 0.5°<α<60°, preferably 1°<α<45°. The choice of this angle also depends on the desired use of the pipetting container.

The measurement support section is in a predetermined manner, known to the control device, unchangeably arranged on the pipetting container in such a way, that the position of the pipetting container is clearly known from the position measurement of the position of the measurement support section. The measurement support section can be integrally formed with the pipetting container. However, it can also be subsequently connected to the pipetting container, e.g. by a non-positive and/or form-fitting and/or cohesive-connecting, e.g. by gluing it to the pipetting container. The measurement support section can also be formed by subsequently modifying the pipetting container, e.g. by embossing, milling or otherwise applying a height profile, also by printing or gluing. Subsequent modification can also include printing with a visually recognizable and evaluable marking, printing or gluing or other application of a visually recognizable structure—e.g. by thermal treatment.

The invention is further defined by a system for detecting the relative position of an end portion of an object, in particular of a pipetting container, the system comprising:
  an object, in particular a pipetting container, comprising an object body, in particular a tubular container body, which comprises a first and a second end portion, the first end portion is configured to connect the object, in particular the pipetting container, to the holding device of the measuring apparatus according to the invention and comprises a measurement support section, at least one portion of the object body, in particular of the tubular container body, which extends along a longitudinal axis, in particular the first end portion extends along a longitudinal axis, wherein the first end portion comprises a measurement support section, which is arranged in such a way that its position measurement with respect to this holding device enables the position of the object, in particular of the pipetting container, to be determined with respect to this holding device, and wherein the second end portion comprises an end region, in particular a mouth region with a fluid exchange opening, which is arranged in a relative position to this measurement support section;
  and a measuring apparatus comprising a holding device for holding the object, in particular a pipetting container, an electronic control device with a processor device for data processing and with a data storage device for storing data, wherein the measuring apparatus comprises a first measuring device, which is arranged to measure a position, in particular a rotational position, of the measurement support section of the object, in particular of a pipetting container, on the holding device, and comprises a second measuring device, which is configured to measure the position of the end portion or the mouth region of the object, in particular of the pipetting container, and wherein the measuring apparatus is configured to store the position of the end region, in particular of the mouth region, as a function of the position of the measurement support section as relative position data in the data storage device, so that subsequently the position of the mouth region of the object, in particular of the pipetting container, can be determined by measuring the position of the measurement support section and from the relative position data.

Further features of the system according to the invention result from the description of the measuring apparatus according to the invention, the laboratory automat and of the method according to the invention.

The invention further relates to a method for detecting the relative position of a mouth region of an object, in particular of a pipetting container, which serves for receiving a fluid laboratory sample by suction and/or dispensing, which comprises an object body, in particular a tubular container body, with a first and a second end portion, wherein the first end portion is configured to connect the object, in particular a pipetting container, to a holding device and comprises a measurement support section, wherein the second end portion comprises an end region, in particular a mouth region with a fluid exchange opening, comprising the steps:
  Measuring a position, in particular a rotational position, of the measurement support section of an object, in particular of a pipetting container, arranged on a holding device by means of a first measuring device; (201)

Measuring the position of the end region or mouth region of the object arranged on the holding device, in particular pipetting containers, by means of a second measuring device; (202)

Storing the position of the end region or mouth region as a function of the position of the measurement support section as relative position data in a data storage device, so that subsequently the position of the end region or mouth region of the pipetting container can be determined by measuring the position of its measurement support section and from the relative position data. (203)

The measurement of the position of the measurement support section and the measurement of the position of the end region can be performed simultaneously, or sequentially, or repeatedly and in any order.

Preferably, the measuring method according to the invention includes at least one of the following steps:

Depositing the measured object, in particular a pipetting container (50; 50') in a storage position; (204)

Grasping the measured object, in particular a pipetting container (50; 50'), again from the storage position and connecting the object, in particular a pipetting container, to the holding device in a current position which deviates from the position of the object, in particular of the pipetting container, during its measurement, so that the position of the end region or mouth region also deviates from the position during its measurement; (205)

Measuring the current position of the measured object, in particular pipetting containers (50; 50'), by measuring the position of its measurement support section (54; 54') relative to the holding device; (206)

Determination of the position of the end region or mouth region of the measured object, in particular pipetting containers, from the current position of its measurement support section and from the stored relative position data. (207)

Further features of the method according to the invention can be found in the description of the laboratory automat according to the invention.

A laboratory sample is a sample that can be treated in a laboratory. Instead of the term laboratory sample, the term "sample" is also used throughout the description of the invention. The sample is a fluid and can be liquid, gel-like, powdery or have such phases. The sample can be a mixture of such phases, in particular a mixture of liquids, a solution, a suspension, e.g. a cell suspension, emulsion or dispersion. A liquid sample can be one that is usually handled in a biological, chemical, medical laboratory. A liquid sample can be an analysis sample, a reagent, a medium, a buffer, etc.

The invention also relates to a laboratory automat for the program-controlled handling of at least one fluid laboratory sample, which comprises the measuring apparatus according to the invention. In this case, the control device of the measuring apparatus may, in particular, be identical to the control device of the laboratory automat, which, by means of a control program, carries out the program-controlled treatment of at least one fluid laboratory sample. However, the two control devices may also be separate and may, in particular, be configured for the exchange of data so that, on the one hand, the laboratory automat can be involved in controlling the measuring apparatus and/or performing the first and/or second measurement or is able to control them, and on the other hand the measuring apparatus is able to transmit the measurement data, in particular data of the first or second measurement, in particular the relative position data, to the control device of the laboratory automat. Furthermore, in this case, the holding device of the measuring apparatus may, in particular, be identical to the holding device of the laboratory automat, but different holding devices may also be used.

The electrical control device of the laboratory automat comprises, in particular an electronic data processing device, in particular a CPU or a microprocessor, and at least one data storage device. The control device can be program-controlled, in particular by means of program parameters, in order to determine the automated control of the sample handling and preferably also the determination of the relative position data as a function of the position measurement data of a pipetting container.

The control device is preferably configured to carry out the measurement procedure according to the invention.

The control device is preferably configured to control the movement of the holding device in relation to the second measuring device or in relation to its sensor, in order to measure the position of the mouth region of the pipetting container.

The control device is preferably configured to control the movement of the second measuring device in relation to the holding device, in order to measure the position of the mouth region of the pipetting container.

The treatment of a laboratory sample(s) may involve one or more of the operations listed below, in particular simultaneously or sequentially:

Transport of the laboratory sample, in particular by a transport device, under the action of gravity and/or a force produced by the laboratory automat;

contactless (non-invasive) physical treatment of the sample, in particular thermal treatment, in particular heating and/or cooling, in particular controlled tempering of the sample; or freezing or thawing of the sample, or other thermal inducing of a phase change of the sample, e.g. evaporation, condensation etc.; magnetic treatment of the sample; optical treatment of the sample, in particular irradiation of the sample with radiation, in particular light, in particular visible light. Infrared light or UV light, or detection of such radiation, in particular fluorescent light, from this sample; magnetic treatment of a sample with magnetic components, in particular magnetic separation of magnetic components, in particular "magnetic beads", from a fluid phase of the sample; moving the sample, i.e. carrying out a mechanical treatment of the sample, in particular shaking, rotating, oscillating, vibrating, centrifuging, acoustic treatment, in particular with ultrasound, in each case, e.g. for the purpose of mixing the sample or separating components within the sample or for transporting the magnetic components out of the sample or into the sample;

invasive physical treatment of the sample, i.e. carrying out a mechanical treatment of the sample: inserting stirring tools, e.g. stirring rod or magnetic stirring fish into the sample and stirring, inserting a probe for acoustic or ultrasonic treatment, inserting means of transport, in particular pipetting containers into the sample, e.g. dispenser tip or pipette tip, or hollow needle or tube; adding other aids into the sample chemical, biochemical or biomedical treatment of the sample: addition of chemical (e.g. reactant, reagent, solvent, solute) biochemical (e.g. biochemical macromolecules, e.g. DNA, DNA components; active pharmaceutical ingredients), or biomedical (blood, serum, cell medium) substances;

Storage of the sample, especially for a program-controlled defined period of time, especially under certain physical conditions, e.g. at certain temperature, temperatures, or temperature changes, especially repeated temperature changes, e.g. cyclically and/or periodically repeated temperature changes, and/or setting of an ambient pressure, e.g. e.g. applying an over-pressure or a vacuum, in particular a vacuum, and/or setting a defined ambient atmosphere, e.g. a protective gas or a certain humidity, under certain radiation conditions, e.g. shielded against visible light, in the dark, or under defined irradiation;

Measurement or analysis of the sample, in particular analysis by non-invasive and/or invasive treatment of the sample, in particular to measure at least one or more chemical, physical, biochemical and/or medical properties of the sample; in particular counting of cells by means of cell counters;

Processing of the sample, in particular changes to at least one property of the sample, in particular by means of non-invasive and/or invasive treatment of the sample.

The laboratory automat can be set up in such a way that other types of treatment can be carried out with it. This can be done by subsequently transferring the necessary files and/or programs or program components to the laboratory automat, in particular into its data storage device, in particular a program module assigned to the type of treatment.

Treatment of the laboratory sample may be particularly useful for:
nucleic acid purification, in particular
"MagSep Blood gDNA": purification of genomic DNA from whole blood, in particular using the Eppendorf MagSep Blood gDNA Kit;
"MagSep Tissue gDNA": Purification of genomic DNA from living tissue, especially using the Eppendorf MagSep Tissue gDNA Kit;
"MagSep Viral DNA/RNA": Purification of viral RNA or DNA from cell-free body fluids, especially using the Eppendorf MagSep Viral DNA/RNA Kit;
and PCR applications, in particular
"Compose Mastermix"; generation of one or more PCT mastermixes ("mastermixes") from premixes ("premixes") or individual components, in particular buffers, polymerase, dNTPs, primers, markers, etc.); thereby, in particular, the volume of each required component is calculated by the control device, in particular by means of the program module associated with the "Compose Mastermix" treatment;
"Normalize Concentrations"; thereby at least two DNA/RNA samples are diluted to obtain the same concentration in all samples; the desired concentrations can be, for example, entered manually by the user or imported from a file;
"Create Dilution Series"; this involves successively diluting one or more standard DNA/RNA samples of known concentration to produce a calibration curve that can be used for quantitative PCR;
"Setup Reactions"; in this process, reaction sequences are created by combining several or many samples with one or more stock mixtures. Optionally, reactions for the replication of DNA/RNA can also be generated.

This handling is particularly program-controlled, using at least one program parameter.

This treatment shall be carried out in particular in accordance with at least one control parameter that determines the treatment of the laboratory sample by the treatment facility. A control parameter can define a time period, a point in time, a certain sample volume and/or dosing volume, a certain sample temperature, etc. A control parameter can relate to the automatic use of a specific transport head, a specific type of pipetting container, a specific type of sample container, one or more individual samples or specific positions of these components in the work area. A control parameter can concern the treatment of an individual sample or the treatment of several or many samples. A control parameter may concern the performance of the first and/or second measurement.

The transport of a sample can be a transport from one sample container to another sample container or another destination. This transport is especially program-controlled, using at least one program parameter.

A pipetting container, in particular the pipetting container according to the invention, serves to receive and/or deliver a fluid laboratory sample. It preferably comprises: a tubular container body having a first and a second end portion. The first end portion has a first opening, the second end portion has a second opening, also called fluid exchange opening.

A pipetting container, in particular the pipetting container according to the invention, preferably has a connecting section, which is arranged for connecting the pipetting container to a holding device. The connecting section is preferably part of the first end portion and may include the measurement support section.

The pipetting container, in particular a pipetting container according to the invention, can for example be a dispenser container, also known as a dispenser tip, which has a cylindrical chamber with a first and second opening, wherein a movable piston engages in the chamber through the first opening as a displacer and is automatically controlled by the laboratory automat. The piston creates a negative or positive pressure in the chamber and thus sucks the sample through the second opening into the chamber or releases it again. This process follows the displacement principle, i.e. the sample to be moved, which is usually liquid and therefore incompressible, is forced to move by moving the volume previously occupied by the sample by the piston. The piston is usually moved by a movement device, which is assigned to the laboratory automat, in particular is moved program controlled.

The pipetting container, in particular a pipetting container according to the invention, can also be a pipette tip. A pipette tip comprises a first opening and the fluid exchange opening. The first opening is coupled to a suction device, so that a liquid sample can be sucked (pipetted) from a sample container via the fluid exchange opening into the pipetting container by a negative pressure. The sample is dispensed by ventilating the suction area, by means of gravity and/or via an overpressure, which is generated e.g. via the second opening of the pipetting container. The suction device is, in particular a component of the laboratory automat and is controlled by it with the help of the control program.

The pipetting container, especially a pipetting container according to the invention, preferably consists partly or completely of plastic, especially polypropylene. It is preferably a consumable that is typically used for only one treatment or a small number of treatment steps of the sample. However, the pipetting container can also be made partly or completely of another material.

A sample container may be an individual container, in which only a single sample is contained, or it may be a multiple container, in which several individual containers are arranged connected to each other.

An individual container may be an open container or a sealable container. In the case of a sealable container, a cover element, in particular a closure cap, may be provided. The cover element can be firmly attached to the container, e.g. as a hinged cover or hinged closure cap, or can be used as a separate component.

Preferably, in the case of a multiple container, the several individual containers are arranged in fixed positions in relation to each other, in particular according to the crossing points of a grid pattern. This simplifies the automated actuation of the positions and particularly the individual addressing of samples. A multiple container may be in the form of a plate element in which the individual containers are connected, such that they form a plate-like arrangement. The individual containers may be in the form of depressions in a plate or may be connected to each other via web elements. The plate element may comprise a frame element in which the individual containers are held. These connections of components can be integral connections, i.e. cohesive connections and/or connections produced by a common injection molding process or may be connections produced by force-fitting and/or form-fitting. The plate element may, in particular be a microtiter plate.

Multiple containers may have a plurality (from 2 to 10) of individual containers. They can also have a variety (greater than 10), typically 12, 16, 24, 32, 48, 64, 96, 384, 1536 of individual containers. The multiple container may in particular be a microtiter plate. A microtiter plate may be designed according to one or more industry standard(s), in particular the industrial standards ANSI/SBS 1-2004, ANSI/SBS 2-2004, ANSI/SBS 3-2004, ANSI/SBS 4-2004.

The maximum sample volume that can be held by a pipetting container or sample container is typically between 0.01 ml and 100 ml, in particular 10-100 µl, 100-500 µl, 0.5 5 ml, 5-25 ml, 25-50 ml, 50-100 ml, depending on the type of pipetting container or sample container selected.

A sample container or pipette container can have an information area that may comprise information about the sample container or about the content thereof. The information area may comprise coded information, e.g. a barcode or QR code, or an RFID chip, or other coded information. The information may comprise information to identify the sample and/or a sample container. The laboratory automat may include an information reading device to read this information and to make it available, preferably to the control device. The information area of a pipetting container can serve as this measurement support section.

The sample container preferably consists partly or completely out of plastic, in particular out of polypropylene. It is preferably a consumable that is typically used for only one treatment or a small number of treatment steps of the sample. However, the sample container may also consist partly or completely out of another material.

The sample container is preferably transportable with a transport device of the laboratory automat.

The laboratory automat is preferably configured to treat a large number of samples consecutively and/or in parallel. In particular, the laboratory automat is preferably configured for the program-controlled handling, in particular to transport, to empty and/or to fill a large number of sample containers, in particular individual containers and/or multiple containers.

The laboratory automat preferably comprises at least one holding device for holding or storing or gripping at least one sample container, in particular a holding frame for holding several individual containers, referred to as "sample container rack". The holding device is preferably configured to be transportable, in order to be movable within the working area of the laboratory automat or between different working areas. The holding device can be used to hold a plurality or number of individual containers at a predetermined position of the holding device. This simplifies the individual program-controlled actuation or addressing of sample containers or of samples.

A workstation may have auxiliary means for positioning and/or aligning one or more components at that work position. These components may, for example, be one, several, or many individual containers, or may have one or more multiple containers, or may have a holding device for sample containers. These auxiliary means can serve to establish a force-fit and/or form-fit connection of these components with the workstation. For example, depressions in the work surface may be provided in the work station at predetermined positions of the work stations as auxiliary means, in order to accommodate elevations of the said components there as complementary auxiliary means in a form-fit manner and thus effect positioning and/or alignment.

One or more adapter devices may be provided for arranging a first holding device in a predetermined manner on a second holding device or on a workstation, in particular for positioning and/or aligning it there.

The laboratory automat preferably has at least one working area which may be open to the environment or may be partially or completely shielded by a housing device. Preferably, the housing device is partially transparent to allow the user to observe the processes that take place in the working area under program control, shielded by the housing device.

The laboratory automat preferably comprises exactly one working area. Such a laboratory automat is compact and may, in particular be suitable for use on a laboratory bench, in which case it is also referred to as a bench device. The bench can, for example, be the workbench of a chemical, biochemical or biomedical laboratory. The laboratory automat can also be configured for installation in such a laboratory. A laboratory automat with a working area can also be configured as an independently working device of such a laboratory or can be integrated into a network of devices.

The laboratory automat can also be configured as a laboratory line in which several working areas are arranged adjacent to each other so that one, several or a variety of samples can be transported one after the other and/or parallel between the working areas by means of a transport device. A working area of a laboratory line is preferably configured to carry out a specific laboratory task, mostly concerning the parallel and/or sequential processing of a large number of samples. Through this specialization of each work area a high throughput of the laboratory line is achieved. In order to perform such a specific task, it may be provided that only one type of treatment of at least one sample, or only a few types of treatments, e.g. two to ten types of treatments, are performed in each working area. The transport device can have a rail system and/or a robot device for program-controlled movement of samples or sample containers.

A laboratory automat can be connected or connectable to a LIMS. LIMS stands for Laboratory Information and Management System. A LIMS is a known software system that concerns data processing in chemical, physical, biological, medical automatic or semiautomatic laboratories. Such data may result from measurements of the samples and/or may concern the control of processing the data. A LIMS is preferably used for the acquisition and evaluation of measured values. LIMS is used to increase the work throughput in a laboratory and/or to optimize the efficiency in the treatment of laboratory samples.

A working area can have a preferably substantially planar, preferably horizontally arranged working surface. The working area can have several predetermined workstations. A workstation can be assigned to a section of the working area. This assignment can be permanent or can be determined by a program. A workstation can be permanently configured or can be equipped differently.

The position of the workstations, and/or the state of the workstation's equipment, can be stored as information in the laboratory automat, in particular in the data storage device. This information can be used to enable the program-controlled handling of samples that are located at specific positions in the working area and that are to be handled at one or more of these workstations.

A workstation can be used for the storage of substances, e.g. storage of samples, cleaning agents, waste.

A workstation can be used to store tool elements.

A tool element may, for example, be a transport head for the transfer of fluid, in particular a pipetting head which may have a connecting section for connecting a pipetting container, in particular a pipette tip or dispenser tip (single-channel pipetting head). The holding device may be or may include the transport head or the transport head may include the holding device. At least one pressure—tight and gas—tight channel that is connected to the pipetting head can be used to suck fluid into the at least one pipette tip when the latter is connected to the connecting section. This pipetting is particularly program-controlled in the laboratory automat, particularly influenced by at least one program parameter. In the case of a dispensing head, this comprises at least one movement device to move at least one piston of at least one dispenser tip. The movement of the movement device of a laboratory automat is particularly program controlled. The transport head can be used for liquid dosing, in particular for dosing in different ranges; a transport head can be configured for dosing a liquid sample with a volume which can be selected from a volume range specific to this transport head: e.g. 1-50 µL, or 20-300 µL, or 50-1000 µL, ("l" and "L" are both abbreviations for liters). A transport head can be designed as a single-channel head in which only one sample is transported. Preferably, specific transport containers are provided, which can be used depending on the respective type of transport head, in particular according to the corresponding volume range.

A tool element may, for example, be a transport head for transporting objects, e.g. a carrying and/or gripping tool for carrying and/or gripping an object, in particular a sample container or a holding device for at least one container. A carrying tool may have an attachment section for releasably attaching the object to the carrying tool, e.g. by force-fitting and/or form-fitting and/or by magnetically connecting the object to the carrying tool. In this way it is possible within the work surface or between several work areas and/or work surfaces.

A tool element can also be a treatment unit, e.g. for performing a thermal, acoustic, optical and/or mechanical treatment of at least one sample.

A workstation can be used to perform a treatment of laboratory samples. For this purpose, a treatment unit can be permanently installed at the workstation or can be arranged there. This handling is particularly program-controlled, using at least one program parameter.

A treatment unit for thermal treatment may have a tempering device to adjust the at least one sample to certain temperatures simultaneously or successively, in particular within fixed periods of time, and/or to change these temperatures at certain rates. This thermal treatment is particularly program-controlled, using at least one program parameter. In this way, for example, a PCR (polymerase chain reaction) can be carried out on one, several or a large number of PCR samples.

A treatment unit for measuring a laboratory sample may have a measuring device for measuring at least one physical property of at least one sample. A treatment unit may have a processing device for processing the at least one sample, in particular to perform a treatment of the at least one sample. A processing device may be used for mechanical processing of the sample, e.g. moving, e.g. shaking or vibrating, thermal processing or treatment by radiation to cause a (bio)chemical reaction or biological or biomedical change of state, e.g. sterilization, of the sample. This processing is particularly program-controlled, in particular by using at least one program parameter.

The laboratory automat may comprise a transport device for transporting at least one movable head section. The head section can be a transport head, in particular for the transport of at least one sample and/or for the transport of at least one tool element. The head section may have at least one connecting section for detaching or permanently connecting it to the transport device.

The transport device may further comprise a program-controlled moving device, also referred to as robot device, for moving the head section and/or the connecting section and in particular, if necessary, the at least one pipetting container in a program-controlled manner, in particular according to a movement sequence predetermined by the control device, or by another control device. The laboratory automat, in particular its control device and/or robot device, is preferably configured to transport the at least one pipetting container connected to the holding device to a measuring station of the laboratory automat, which comprises this second measuring device, which is configured to measure the position of the second end portion of the pipetting container. The laboratory automat, in particular its control device and/or robot device, is preferably configured to move the holding device and the at least one pipetting container connected thereto during the measurement of the position of the second end portion of the pipetting container, in particular according to a predetermined movement, which may be a linear, in particular a vertical movement. Alternatively, or additionally, the measuring device or a moving part of the measuring device can be moved in a similar way during measurement.

The robot device may comprise one or more drive devices, e.g. electric motors, to enable the program-controlled movement of movable components, e.g. a movable head section, in particular a holding or gripping tool, or another movable tool element, e.g. a movable treatment unit. The robot device may comprise a single- or multi-joint movement arm, by means of which the transport of the head section, and in particular the transport of samples, between different, preferably freely selectable, positions of the working area is possible. The robot device may also comprise a rail system, in which case the head section is attached to a movable sliding or rolling element that can be moved via this rail system to the positions determined by the arrangement of the rail system. The movements of the robot device are preferably program-controlled, and in particular controlled by at least one program parameter.

The laboratory automat may comprise an information reading device to read information about a sample and/or a sample container and/or a treatment instruction for this sample and/or for this sample container and/or analogous to a pipetting container and, preferably, to make it available to the control device of the laboratory automat.

The laboratory automat preferably comprises at least one dosing device. With this, preferably at least one desired sample volume can be pipetted and automatically dosed and distributed. The dosing device or control device is preferably configured to effect the transport of a predetermined volume of a sample from a sample container into a pipetting container and/or from the pipetting container into a sample container or to any another destination. This is done, for example, by the actuation of a suction device of a pipetting device, in particular by the actuation of a movement device of a dispensing device, which are each integrated preferably into a transport head. This control is preferably program controlled.

The laboratory automat preferably comprises at least one timer and/or preferably a timer device in order to enable the time-dependent treatment of the samples. The time-dependent treatment is preferably program-controlled, and in particular controlled by at least one program parameter.

In a preferred embodiment of the laboratory automat according to the invention, the latter is configured to automatically select one or more of the following components for use in a program controlled treatment, depending on the type of treatment selected by the user and on the program parameters entered by the user:
- at least one suitable sample container, in particular suitable for holding several samples, which are to be processed together, e.g. which are to be mixed or between which a chemical reaction or biochemical, biological or biomedical interaction should occur;
- at least one suitable pipetting container, in particular a pipette tip and/or a dispenser tip;
- at least one suitable transport head to which the preferably automatically selected pipetting container can be connected,
- at least one suitable tool element, which serves to carry out the desired treatment.

Preferably, the laboratory automat according to the invention is configured to automatically select one or more of the following control parameters for use in a program-controlled treatment, depending on the type of treatment selected by the user and on the program parameters entered by the user:
- at least one period of time, during which a certain step of the treatment is carried out;
- at least one sample volume and/or dosing volume;
- at least one working position of the at least one working surface;
- movement parameters for determining the movement sequence of the robot device of the laboratory automat for the desired treatment of the sample.

Due to the automatic selection of the mentioned components and/or of the control parameters depending on at least one program parameter, in particular depending on the at least one program parameter selected by the user, the advantage for the user is that he does not have to determine the selection of components and control parameters individually by himself. Rather, the selection of the control parameters necessary for the treatment is done by means of the program parameters entered by the user. This makes the use of the laboratory automat particularly convenient.

The treatment device of the laboratory automat comprises: preferably at least one working area, preferably at least one transport device, preferably at least one treatment unit.

A pipetting container may be, in particular a multichannel pipetting container. A multichannel pipetting container, in particular a multichannel pipetting container according to the invention, serves for the parallel and/or simultaneous uptake and/or for the parallel and/or simultaneous dispensing of a plurality of fluid laboratory samples. This plurality of channels and laboratory samples of the multichannel pipetting container may in particular be adapted to the number of rows and/or columns of a multiple container, in particular to a microtiter plate. The plurality of M=8 is particularly preferred. But also, other values of M can be chosen, which, in particular, can be selected from the group of thirty-one preferred values $\{2, 3, 4, \ldots, 8, \ldots, 12, \ldots, 16, \ldots, 24, \ldots 31, 32\}$. A multichannel pipetting container preferably comprises: a plurality M of tubular container bodies, preferably arranged parallel and spaced apart to each other, preferably at a distance suitable for standard microtiter plates, of preferably d=9 mm or d=4.5 mm (from center to center of the openings of adjacent tubular container bodies; alternatively, the distance of the longitudinal axes of adjacent container bodies can be used), wherein the multichannel pipetting container comprises a first and a second end portion. The first end portion comprises a first opening, the second end portion comprises a plurality M of second openings, also called fluid exchange openings.

Each of the container bodies of this plurality of container bodies preferably comprises a longitudinal axis A along which the container body extends. These longitudinal axes A preferably run parallel, each at a distance d, as described, whereby the longitudinal axes A are in particular arranged linearly next to each other, so that in particular the longitudinal axes essentially cross a straight line C, which runs perpendicular to each of the axes A.

A multichannel pipetting container, in particular the multichannel pipetting container according to the invention, preferably comprises a connecting section, which is arranged for connecting the multichannel pipetting container to a holding device. The connecting section is preferably part of the first end portion and may include the measurement support section. The first connecting section of the object formed as a multichannel pipetting container runs in particular along the longitudinal axis A (axis of rotation) of the multichannel pipetting container. At least one of the longitudinal axes A, which runs through the majority of the container bodies, in particular each of these longitudinal axes, runs substantially parallel, in particular parallel, to the longitudinal axis A (axis of rotation) of the multichannel pipetting container, about which the multichannel pipetting container can be rotated to induce a rotational position. The possible deviation of the parallel position of said longitudinal axes from the longitudinal axis (axis of rotation) of the multichannel pipetting container may be caused by a defect, which may have been created during the manufacture of the multichannel pipetting container or which may have been created after manufacture, for example by thermal deformation of a container body made of plastic.

The multichannel pipetting container, in particular a multichannel pipetting container according to the invention, may, for example, comprise at least two container bodies formed as dispenser containers. Such dispenser containers are also known as dispenser tips or dispenser syringes. A dispenser container has a generally cylindrical chamber with first and second openings, wherein a movable piston acts as a displacer in the chamber through the first opening and is automatically controlled by a laboratory automat. The piston creates a negative or positive pressure in the chamber and thus sucks the sample through the second opening into the chamber or dispenses the sample again. This process follows the displacement principle, i.e. the sample to be moved, which is usually liquid and therefore incompressible, is forced to move by moving the volume previously occupied by the sample by the piston. The piston is usually moved by a movement device, which is assigned to the laboratory automat, in particular moved program controlled.

The multichannel pipetting container, in particular a multichannel pipetting container according to the invention, preferably consists partly or completely out of plastic, in particular out of polypropylene. It is preferably a consumable that is typically used for only one treatment or a small number of treatment steps of the sample. However, the multichannel pipetting container can also be made partly or completely out of another material.

A multichannel pipetting container may, in particular, be a multichannel dispensing container with which a fluid volume can first be taken up into the respective container body via each channel, and in which dispensing via each channel can take place step by step. An example of a multi-channel dispensing container is the multi-channel syringe described in the European patent application EP 3 260 822 A1. A container body of this multi-channel syringe is called a syringe cylinder there.

The object held by the holding device of the measuring apparatus is preferably a tool element, in particular a transport head for fluid transfer, in particular a pipetting head, which may have a connecting section for connecting at least one pipetting container, in particular at least one pipette tip or at least one dispenser tip. This tool element may, in particular be a multichannel pipetting head. The tool element can be configured for use with at least one or more exchangeable tools, wherein, in particular the at least one exchangeable tool can comprise the second end portion with the end region, whose position is measured by means of the second measuring device and is stored as relative position data in the data storage device ("relative" reference) as a function of the position of the measurement support section. The tool element, formed as a multichannel pipetting head, can in particular be configured to be connected or connectable to at least two pipetting tips, which serve as tools for parallel or simultaneous fluid transfer.

Via at least one pressure- and gas-tight channel connected to the multichannel pipetting head, liquid can be aspirated in parallel or simultaneously into the at least two pipette tips when connected to the corresponding connecting sections of the multichannel pipetting head. This multichannel pipetting in a laboratory automat is, in particular program controlled, in particular influenced by at least one program parameter. In the case of a tool element designed as a dispensing head, this has at least one movement device for moving at least one piston of at least one dispenser tip. The movement of the movement device of a laboratory automat is particularly program controlled.

The multichannel pipetting head can be used for liquid dosing, in particular for dosing in different volume ranges; a multichannel pipetting head can be configured for dosing several liquid samples, each with a volume which can be selected from a volume range specific to this multichannel pipetting head: e.g. 1-50 µL, or 20-300 µL, or 50-1000 µL, ("l" and "L" are abbreviations for liters). Preferably specific transport containers, in particular pipette tips, are provided, which can be used depending on the respective type of multichannel pipetting head, in particular according to the corresponding volume range.

The object of the invention, in particular multichannel pipetting containers, comprises an object body which may contain several tubular container bodies. The object body comprises a first and a second end portion. The second end portion may, in particular comprise several container bodies. The end region of the second end portion may include the multiple mouth regions of the multiple container bodies, wherein a mouth region respectively comprises the fluid exchange opening of the respective container body. The first end portion is configured to connect the object, in particular the multichannel pipetting container, to the holding device of the measuring apparatus according to the invention and comprises a measurement support section. At least one portion of the object body, in particular the respective tubular container body or at least one portion of the tubular container bodies, preferably extends along a longitudinal axis A. The measurement support section is configured such that measuring its position in relation to this holding device allows to determine the position of the object, in particular of the multichannel pipetting container, in relation to this holding device. The end region with the several mouth regions has a position in relation to this measurement support section, i.e. a relative position. The measuring apparatus is configured to store the position of the end region as a function of the position of the measurement support section as relative position data in the data storage device, such that subsequently the position of the end region of the multichannel pipetting container can be determined by measuring the position of the measurement support section and from the relative position data.

The measuring apparatus may be configured to detect or to measure, by means of the second measuring device, the positions of several mouth regions of the end region, in particular of all mouth regions, in relation to the measurement support section. The measuring apparatus may comprise an evaluation device to evaluate the measurement of the positions of the several mouth regions, in particular to determine the relative position data from the recorded positions of the several mouth regions. Preferably, the evaluation device is configured to derive a statistical value that defines the relative position data from the recorded positions of the several mouth regions. This statistical value can be a mean quantity, in particular a mean value, a median, or preferably a mean range value. A mean range value is generally defined as the arithmetic mean of the largest and smallest observed values.

For example, the position measurement of a mouth region may require that the position of the mouth region is determined in a plane—or the position of the projection of the mouth region along the axis A onto this plane—which is perpendicular to the longitudinal axis A of the container body and runs through the straight line C, on which the individual longitudinal axes A of the container bodies of the multichannel pipetting container are lined up. The position of a mouth region—assumed as a point, e.g. as the center of the mouth opening of the mouth region—can then be determined by the distance of the mouth region considered in this plane and, in particular, also by the direction of the mouth region. The distance may be expressed, in particular as the distance of the mouth region starting from the position of the longitudinal axis A of the associated container body within this plane or as a distance from a point on the holding device. The position of a mouth region can also be specified as a point (x, y) of a Cartesian coordinate system whose origin is in particular the position of the longitudinal axis A in this plane and whose x-axis is the straight-line C. The relative position data to be stored could then include a mean value point (M_x, M_y), which is determined from the mean value M_x of the xi values and the mean value M_y of the yi values of the considered positions (xi, yi) of the mouth regions, wherein each of the positions (xi, yi) is defined with respect to the longitudinal axis Ai, which belongs to each respective container body, which determines the origin of each respective coordinate system. This mean value point can also be defined as a range mean value (W_x, W_y), wherein W_x is defined as the arithmetic mean of the largest value xi_max and the smallest value xi_min of all values xi, thus W_x=(xi_max−xi_min)/2 and wherein W_y is defined as the arithmetic mean of the largest value yi_max and the smallest value yi_min of all values yi, thus W_y=(yi_max−yi_min)/2. Alternatively, a point on the holding device may be selected as the origin of said coordinate system, whose x-axis may also be set in relation to the holding device.

The evaluation device is preferably part of an electronic control device of the measuring apparatus.

The measurement support section serves in particular to enable a unique determination of the position of the multichannel pipetting container in relation to a fixed coordinate system, which can be fixed in particular to the holding device or in the working area of a measuring apparatus or of a laboratory container. The most accurate possible indication of the relative position of the multichannel pipetting container with respect to the measurement support section can make it useful to acquire several measurement data by means of the second measuring device and to store these several measurement data in the form of a data record as these relative position data. The relative position data can also include a data set containing a plurality M1 of measurement data. Each of these measurement data of the data set can contain the information about a position of a mouth region of a container body of a multichannel pipetting container.

In a first preferred embodiment, the multichannel pipetting container is shaped such that the longitudinal axis of each container body runs centrally through the mouth region. Such a multichannel pipetting container is particularly suitable for dispensing the sample according to the free jet principle, in particular in the vertical downward direction, i.e. in the direction of gravity.

In a second preferred embodiment, the multichannel pipetting container is shaped such that the mouth region of each container body is located at a perpendicular distance d>0 to the container body's longitudinal axis. This offset d>0 makes such a multichannel pipetting container particularly suitable for wall dispensing of the sample, wherein the exact choice of d depends on the desired use of the multichannel pipetting container, in particular on the diameter of the sample container at which wall dispensing is to take place. In this case, the mouth region is in particular arranged in such a way that a longitudinal axis runs through the fluid exchange opening and the mouth region, in particular it also runs through the entire second end portion, in an oblique vertical downward direction, i.e. at an angle $\alpha>0°$ to the longitudinal axis, preferably $0°<\alpha<80°$, preferably $0.5°<\alpha<60°$, preferably $1°<\alpha<45°$. The choice of this angle also depends on the desired use of the pipetting container.

The second measuring device is configured to measure the position of the end region, in particular of the mouth region of the pipetting container, in particular of the multichannel pipetting container. The second measuring device is preferably configured to detect the position of one or more points of the end region in relation to the measurement support section. The second measuring device is preferably set up to detect the position of more than one point of the end region in relation to the measurement support section, in particular to detect a large number of points of the end region in relation to the measurement support section. This allows the position of the end range to be specified even more precisely. In the case of a multichannel pipetting container, the positions of several or of all mouth regions of the container bodies of the multichannel pipetting container can thus be recorded, such that accurate or complete information about the information of the in this case multi-sectional end region can be stored.

In the case of an object configured as a multichannel pipetting container the second measuring device may be configured in the same way as for the case of a measurement at an object configured as a (single) pipetting container. Preferably the second measuring device comprises at least one light source and at least one optical sensor arranged or capable of being arranged to measure the position of the mouth region. In particular, such components of the second measuring device and the multichannel pipetting container may be arranged to perform a predetermined relative movement. In this way, the spatial region receiving or containing the multichannel pipetting container can be optically scanned, in order to determine the position of the mouth regions of the container bodies of the multichannel pipetting container, preferably one after the other, by moving the mouth regions one after the other to a measuring position in the spatial region, at which the position of the mouth region is measured. However, the mouth regions can all be measured at the same time or parts can be measured at the same time, in order to measure or record the positions of several or all mouth regions simultaneously.

To carry out the relative movement, the multichannel pipetting container is preferably guided linearly, in particular horizontally, with respect to the second measuring device through the mentioned spatial region. The position of the multichannel pipetting container is then preferably such that the linear relative movement is parallel to the axis C, along which the container bodies of the multichannel pipetting container are preferably lined up. It is also possible for the relative movement to be vertical by inserting the multichannel pipetting container vertically from above into the abovementioned spatial region in order to perform the measurement there.

In a preferred embodiment, a second measuring device comprises at least one light source, in particular an LED, in particular an infrared LED, which provides the light for illuminating the spatial region which, for the purpose of the measurement, at least temporarily contains at least one mouth region of the container bodies of the multichannel pipetting container. Preferably the light is evenly directed onto this spatial region. Preferably, the light is directed onto this spatial region essentially collimated, in particular collimated. This is guided in particular by means of beam guidance measures, e.g. lens(es), mirror(s) etc., in such a way that it passes through the space portion from two directions and then falls on at least one optical sensor. This can in particular be a line sensor, in particular a CCD or a CMOS line sensor.

In order to determine the position of the mouth region by means of the line sensor, the spatially resolved detected variation in shading, which results when the second end portion or the mouth region is moved with a predetermined movement—in particular at constant speed—in a predetermined direction—in particular in the horizontal direction and/or in the direction of the longitudinal axis of the first end portion or in the vertical direction—is preferably evaluated by the control device.

Preferably, the control device is generally configured to control this predetermined movement, in particular in such a way that the object, in particular a pipetting container or, as described here, the multichannel pipetting container, in particular the respective second end portion or the mouth region, is not moving at the time of measurement in order to detect a shadow with the sharpest possible edge. However, it is also possible and preferred that the sensitivity of the sensor is suitable and that the time period of the sensor measurement, i.e. in particular an exposure time, is suitably short so that when the object is moving, the moving distance of the shadow of the observed second end portion or of the mouth region is smaller than the width of a pixel of the optical sensor in this direction of movement—it is assumed in this observation that the spatial resolution of the sensor is determined by its pixel density. The control device is preferably configured to relate the central position of the respective end portion or of the mouth region, calculated from the shadows, to the position defined by the longitudinal axis A of the respective object or of a pipetting container or of the longitudinal axis Ai of a multipipetting container, in order to calculate the deviation or necessary correction thereof. This correction considers, if necessary, a mean quantity determined from several measured data of the second measuring device.

Since the light passes through the space portion from two directions, there are two separate shadows—within the position tolerances permitted by the implemented geometry—when the pipetting container is positioned in the space portion. If the body of the multichannel pipetting container is moved in the space section, the position of the shadows on the line sensor changes. A position of the respective end portion deviating from an ideal (measuring) position can also be determined if the end portion is placed at an ideal known position, which can be calculated from the known coordinates of the measuring device and the ideal geometric data of the end portion, or after determination with the aid of a reference tip. This is the case, for example, with an inclined end portion. In combination with the known measurement geometry and by means of conventional considerations of projection and coordinate transformation, the current position of the mouth region with the reference point on the holding device can be inferred to and thus the lateral deviation with respect to a reference position can be determined. (If the end section is guided into the light curtain from above or with its end face vertical, thus creating a shadow image on the sensor, the z-position of the pipette tip can be measured and thus the length of the tip can be measured and if necessary the end face can be corrected to a desired position. Such a solution is particularly efficient if the holding device is configured as a movable component of a laboratory automat anyway.

The second measuring device is preferably configured to perform at least one optical measurement from two different directions each. This optical measurement may in particular provide for the acquisition of an image of more than one mouth region or of all mouth regions of a multichannel pipetting container. For this purpose, the second measuring device may comprise one or two image sensors, or additional image sensors. The image sensors are preferably arranged parallel to a longitudinal axis A and parallel to the axis C of the multichannel pipetting container.

The second measuring device and the holding device are preferably arranged movably to each other. This allows, in particular, a multichannel pipetting container connected to the holding device to be positioned on the second measuring device as required, in order to perform the position measurement. If the measuring apparatus is stationary arranged in the working area of a laboratory automat, the holding device can be moved to the position of the measuring apparatus to perform the position measurement. The time required for this—and the space required on the workspace—can be optimally reduced if the second measuring device is movably arranged on the holding device in a preferred design. Also, in this case the second measuring device can be moved to the pipetting container if necessary, but the required distance of the movement is shortened. If the holding device is moved, the second measuring device is moved in the same way, so that the distance does not depend—as mentioned in the first case—on the position of the holding device in the working area.

Further preferred embodiments of the laboratory automat according to the invention and the method according to the invention result from the following description of the embodiments in connection with the figures and their description. Identical components of the embodiments are essentially identified by identical reference signs, unless this is described differently or results otherwise from the context. It shows:

FIG. 1 schematically shows an embodiment of a measuring apparatus according to the invention.

FIG. 6a shows, in a perspective view, the first end portion of a pipetting container according to a preferred embodiment, and its measurement support section.

FIG. 6b shows, in a side view, a pipetting container according to a preferred embodiment and a part of a holding device of a measuring apparatus according to an embodiment, wherein the pipetting container is not connected to the holding device.

FIG. 6c shows the same components as FIG. 6b, wherein the pipetting container is connected to the holding device.

FIG. 7a shows a pipetting container according to a preferred embodiment, in free jet dispensing over a sample container.

FIG. 7b shows a pipetting container according to another preferred embodiment, in wall dispensing over a sample container.

FIG. 8b shows a diagram with the output signal of an optical line sensor, which is part of the second measuring device according to FIG. 8a.

FIG. 9 shows schematically the procedure as an embodiment of the method according to the invention.

FIG. 10 shows a perspective view of an embodiment of a multichannel pipetting container, which, according to an embodiment, is arranged at the second measuring device of a measuring apparatus.

FIG. 11 shows a frontal side view of a part of the second portion of the multichannel pipetting container shown in FIG. 10 and coordinate systems assigned to the eight longitudinal axes of the multichannel pipetting container, on the basis of which the calculation of the relative position of the end region is explained according to an embodiment.

Figure 1:
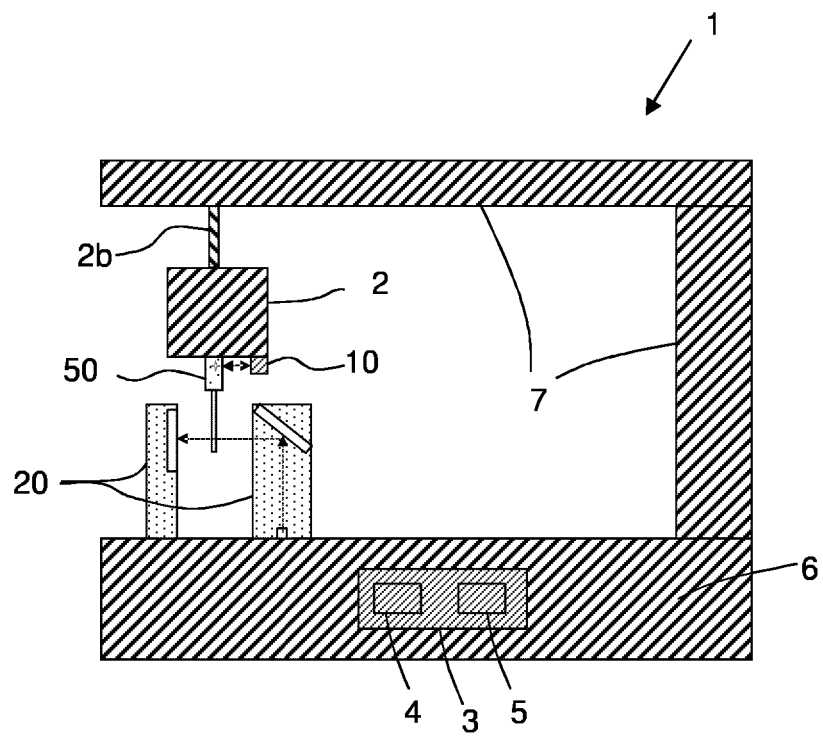

FIG. 1 shows the measuring apparatus 1, which is configured to detect the relative position of an end portion of a movable object, here a pipetting container 50. This is used for pipetting in the broadest sense, i.e. on the one hand for taking a fluid, usually liquid, laboratory sample by suction into the pipetting container and on the other hand for dispensing the fluid laboratory sample. It comprises a tubular container body 55, 55' having a first end portion 51, 51' and a second end portion 52, 52' as shown in FIGS. 7a and 7b, respectively, with the exemplary dispenser tips 50, 50' according to the invention, wherein the first end portion is adapted to connect the pipetting container to the holding device and comprises a measurement support section 54, 54', and wherein the second end portion comprises a mouth region 56, 56' with a fluid exchange opening 57, 57'.

The measurement support section 54, 54' is here formed as a height profile 54a, 54b arranged around the longitudinal axis A of the pipetting container and on its mounting flange 58, 58'. The height of the height profile 54a, 54b (FIG. 6a) varies around the axis A in direction A. It is formed in such a way that it can be locked relative to the holding device 2 in a predetermined number N, here N=7, preferably N=14, of locking positions defined by means of locking elements 54c (see FIGS. 6a, 6b), when the mounting flange 58, 58' is locked to the holding clamps 2c. Said attachment can be released from the control device by electronic control of an actuator (not shown). A scanning device 60 with N mechanical pressure switches detects at each pressure switch position, whether it was deflected by the height profile or not (switch positions 0 and 1, corresponding to the information of 1 bit). As the height profile is not rotationally symmetrical to axis A, the rotational position can be determined from the height profile. Furthermore, the height profile can be used to code further information, e.g. the type of pipetting container predefined by the manufacturer.

The measuring apparatus comprises a carrier device 7, mounted on the base plate 6 for carrying the holding device 2, which carries the pipetting container 50, in particular a moving device 2b for moving the connecting section, by which the pipetting container is connected to the holding device, furthermore an electronic control device 3 with a processor device 4 for data processing and with a data storage device 5 for storing data.

The measuring apparatus 1 has a first measuring device 10, which is configured to measure a position, here a rotational position, of the measurement support section of the pipetting container 50, 50' on the holding device, and a second measuring device 20, which is configured to measure the position of the mouth region 56, 56' of the pipetting container.

The measuring apparatus 1 or its control device 3 is configured to store the position of the mouth region 56, 56' as a function of the position of the measurement support section 54, 54' as relative position data in the data storage device 5, so that subsequently the position of the mouth region of the pipetting container can be determined by measuring the position of the measurement support section and from the relative position data. If the pipetting container comprises an electronically detectable individual identification, the data stored in the data storage device (relative position data) can be supplemented by the identification data. The relative position of the mouth region can then be queried from the identification. If no identification marking is available, only the placement position of the measured pipetting container must be tracked electronically, which is not difficult in the case of a laboratory automat.

Figure 4:
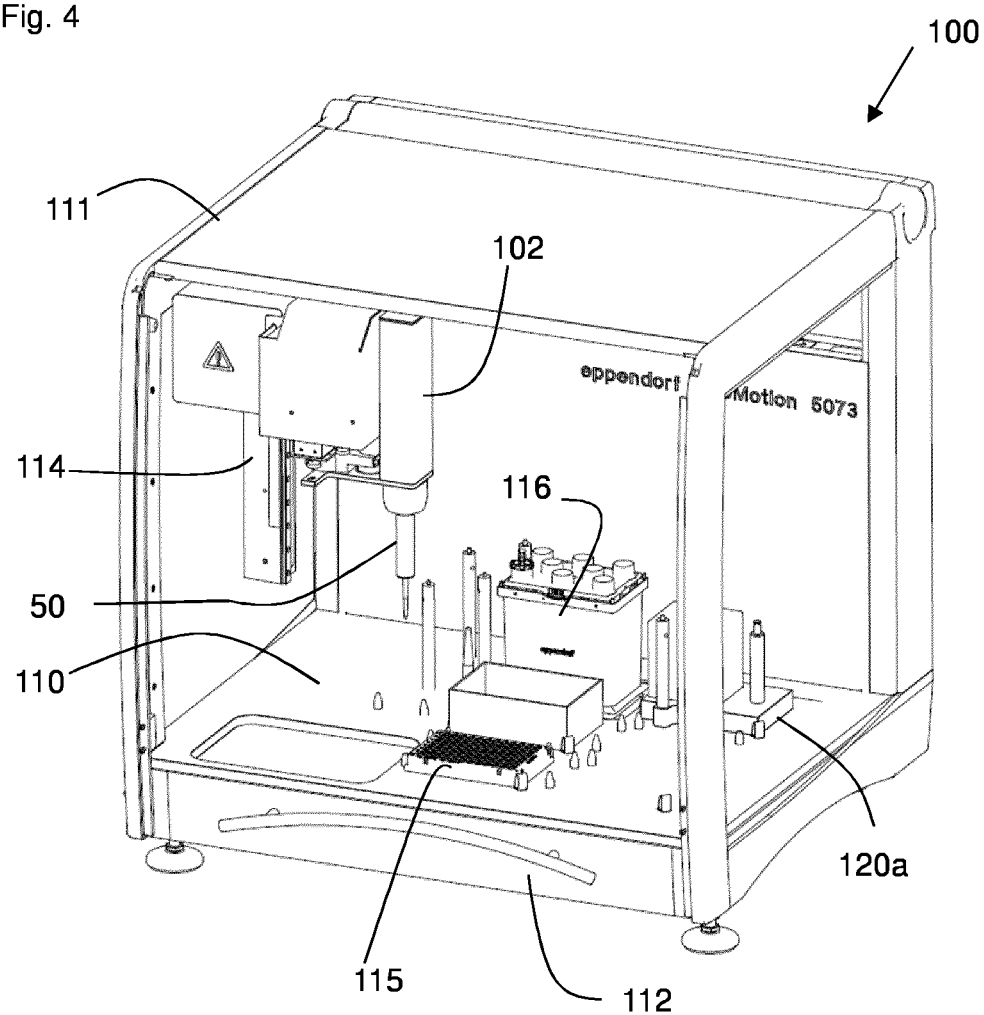
FIG. 4 shows, in a perspective view, an embodiment of an laboratory automat equipped with the measuring apparatus of the invention comprising the components shown in FIGS. 2 and 3.

FIG. 4 shows a laboratory automat 100 for the treatment of at least one fluid laboratory sample (liquid handling automat), which can be equipped with a measuring apparatus according to the invention. The working area 110 with the working space above is enclosed by a housing 111 with front door 112. Various items such as a microtiter plate 115 and a sample tube holder 116 are placed on the work area at specific workstations. The opening of the front door 112 is electronically monitored by the control unit of the laboratory automat by means of a sensor. Once the relative position data of the mouth region position of a particular pipetting container has been determined with the front door of the working area closed, by storing the movement history of this pipetting container, the information about its relative position data can be retrieved correctly at any time with the utmost certainty. If the front door has not been opened, the position of the pipetting container in the working area cannot be changed by a user.

The laboratory automat comprises a holding device 102 for holding the pipetting container 50, here a dispenser tip. The holding device 102 can be automatically positioned in the working area by a robot device 114. The pipetting function of sucking or dispensing the fluid laboratory sample into/from the pipetting container is achieved by automatically moving the piston 59, 59' (partially visible in FIG. 7a, 7b).

Figure 2:
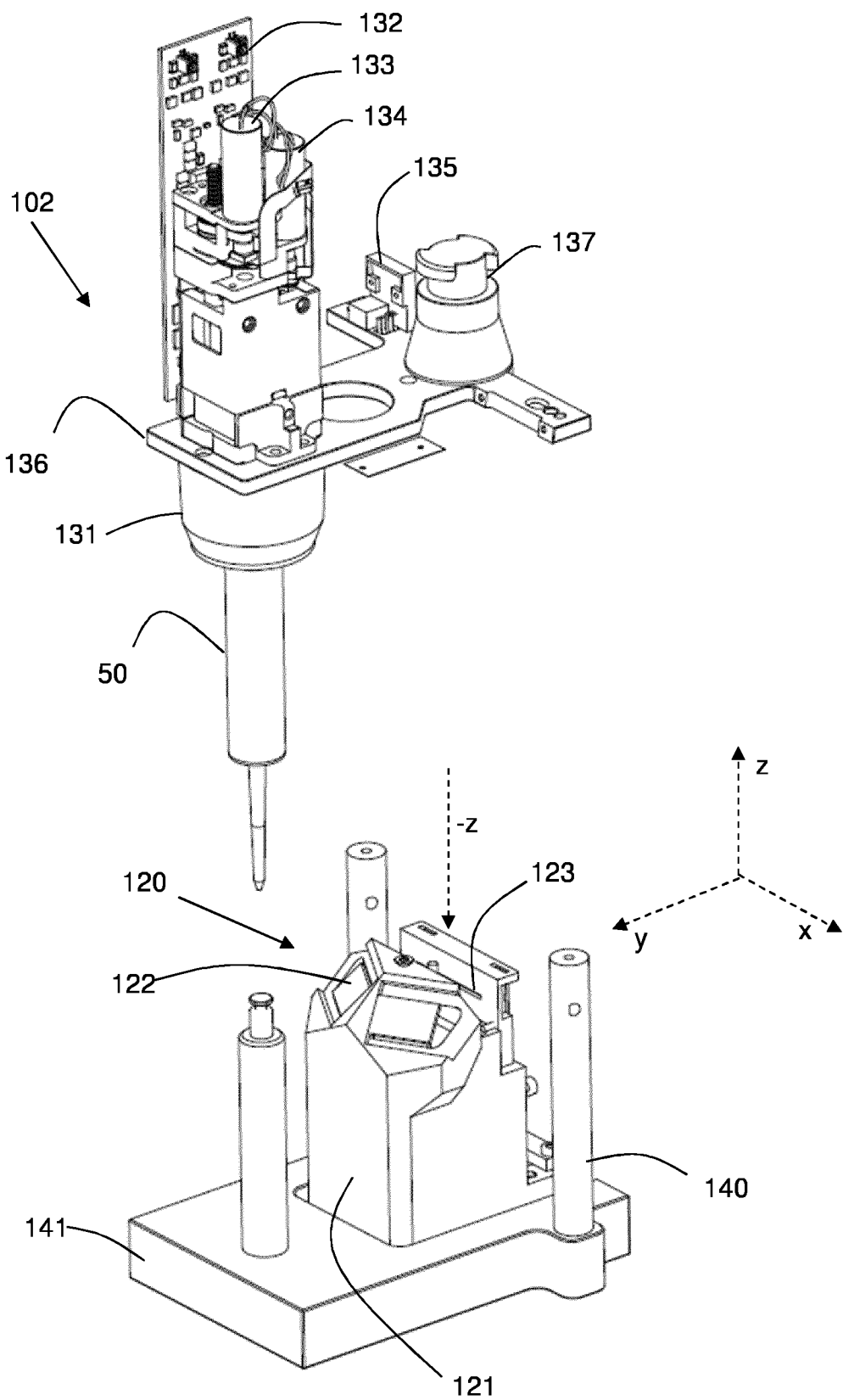
FIG. 2 shows, in a perspective view, an embodiment of components of a measuring apparatus according to the invention.
Figure 3:
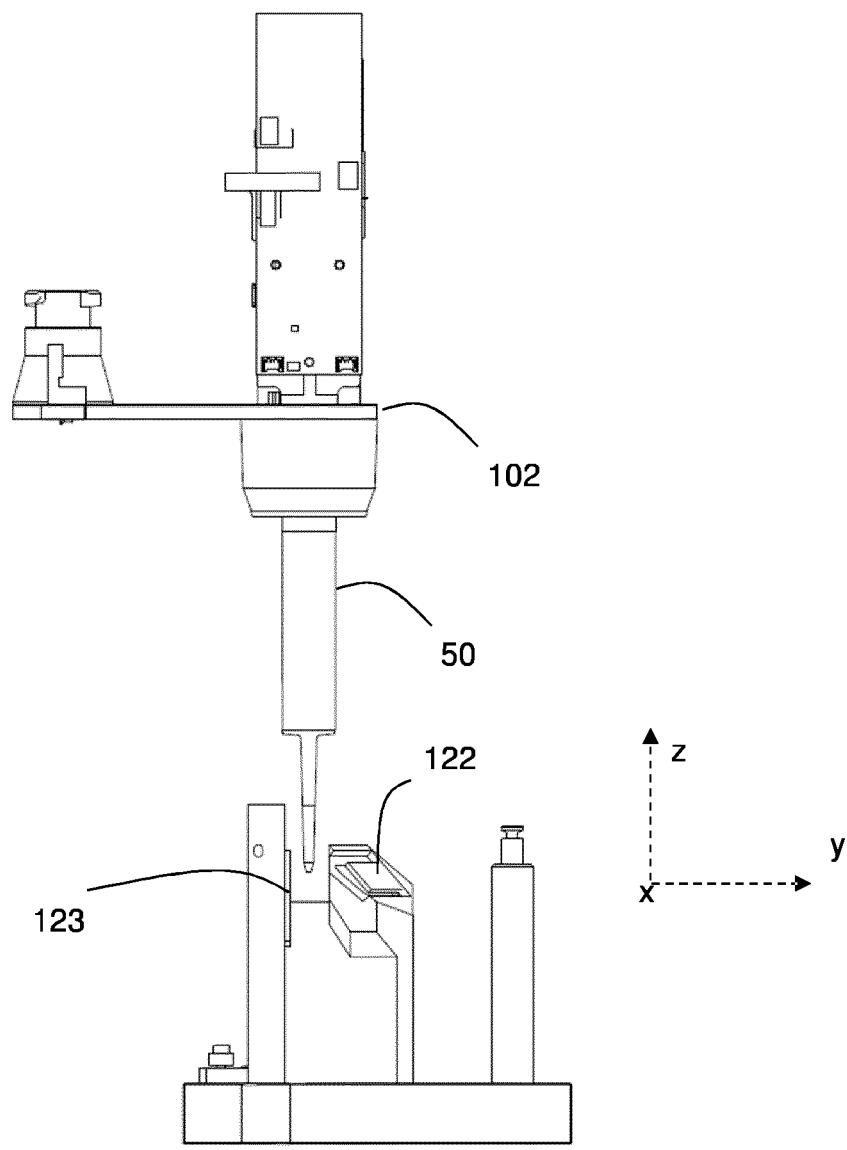
FIG. 3 shows, in a side view, the components from FIG. 2, in a measuring position of the second measuring device of the measuring apparatus.

The components of the measuring apparatus to be used in the laboratory automat 100, in particular the position 120a to accommodate the second measuring device 120, are shown in FIGS. 2 and 3. The holding device comprises a connecting section 131 for connecting the pipetting container 50, 50'. In addition, measuring device 60 is integrated in the connecting section, which in the embodiment contacts the pipetting container in the connecting position, see FIG. 6c. The holding device is mounted on a holding plate 136, which serves in particular as a bearing element with which the entire holding device can be placed by the robot device on the support columns 140, which are arranged on top of a plate member 141, and stored there. The bearing position can also be used as a reference position to calibrate the position of the holding device relative to the second measuring device 120 in x, y and/or z direction. The holding device 102 is connected to the robot device via the bayonet 137. The holding device carries an ejector motor 133 for ejecting the dispenser tip 50, 50' by actuating the clamp elements 2c. It also carries the hoist motor 134, which serves to specifically deflect the piston 59, 59' of the dispenser tips. The operation of these components is controlled by the control electronics on circuit board 132, which in turn can be controlled via connections 135 and ducts (not shown) from the control unit of the laboratory automat.

Figure 8A:
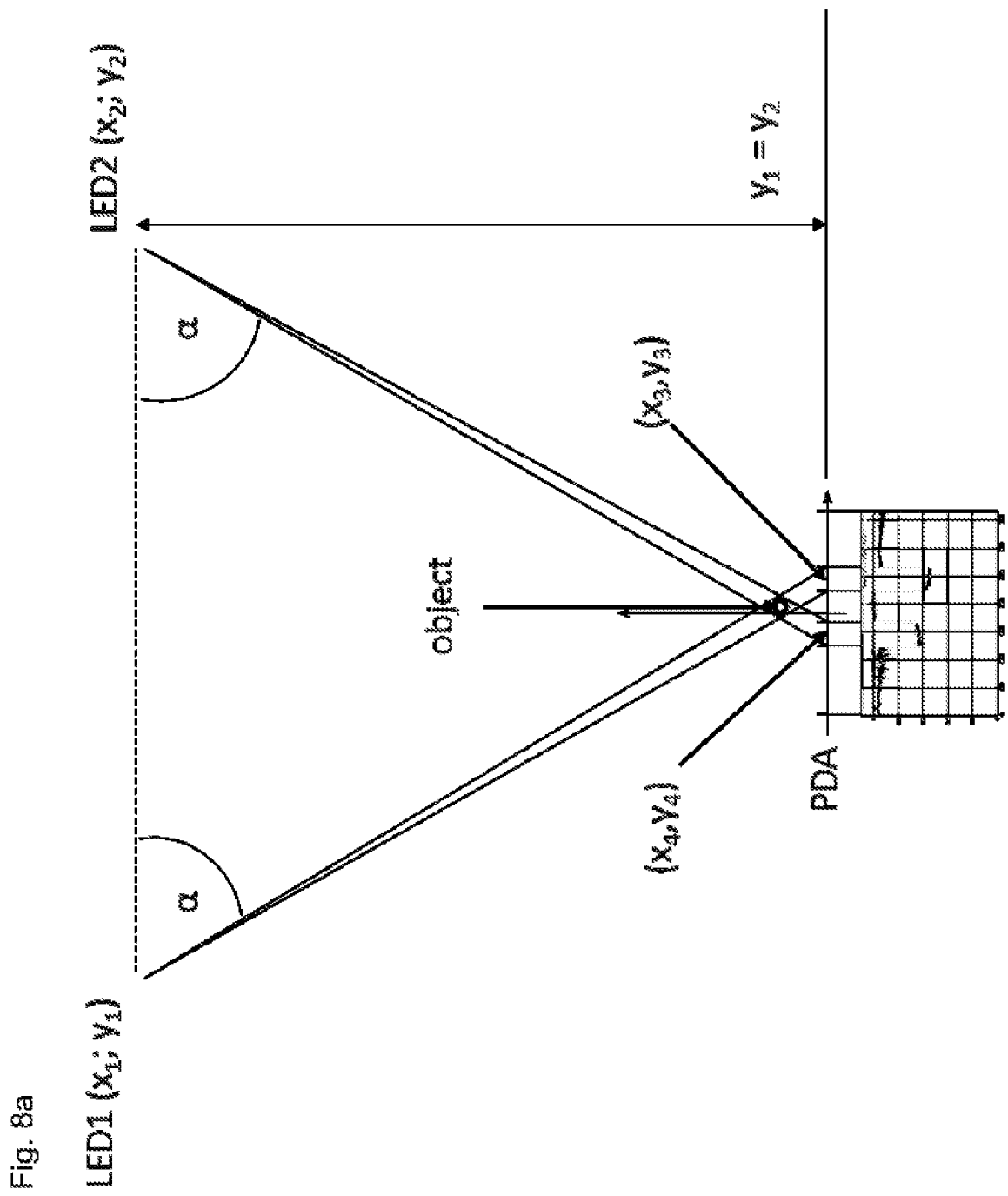
FIG. 8a shows an embodiment of a measuring arrangement with a second measuring device of a measuring apparatus according to the embodiment of FIGS. 2 and 3.
Figure 8B:
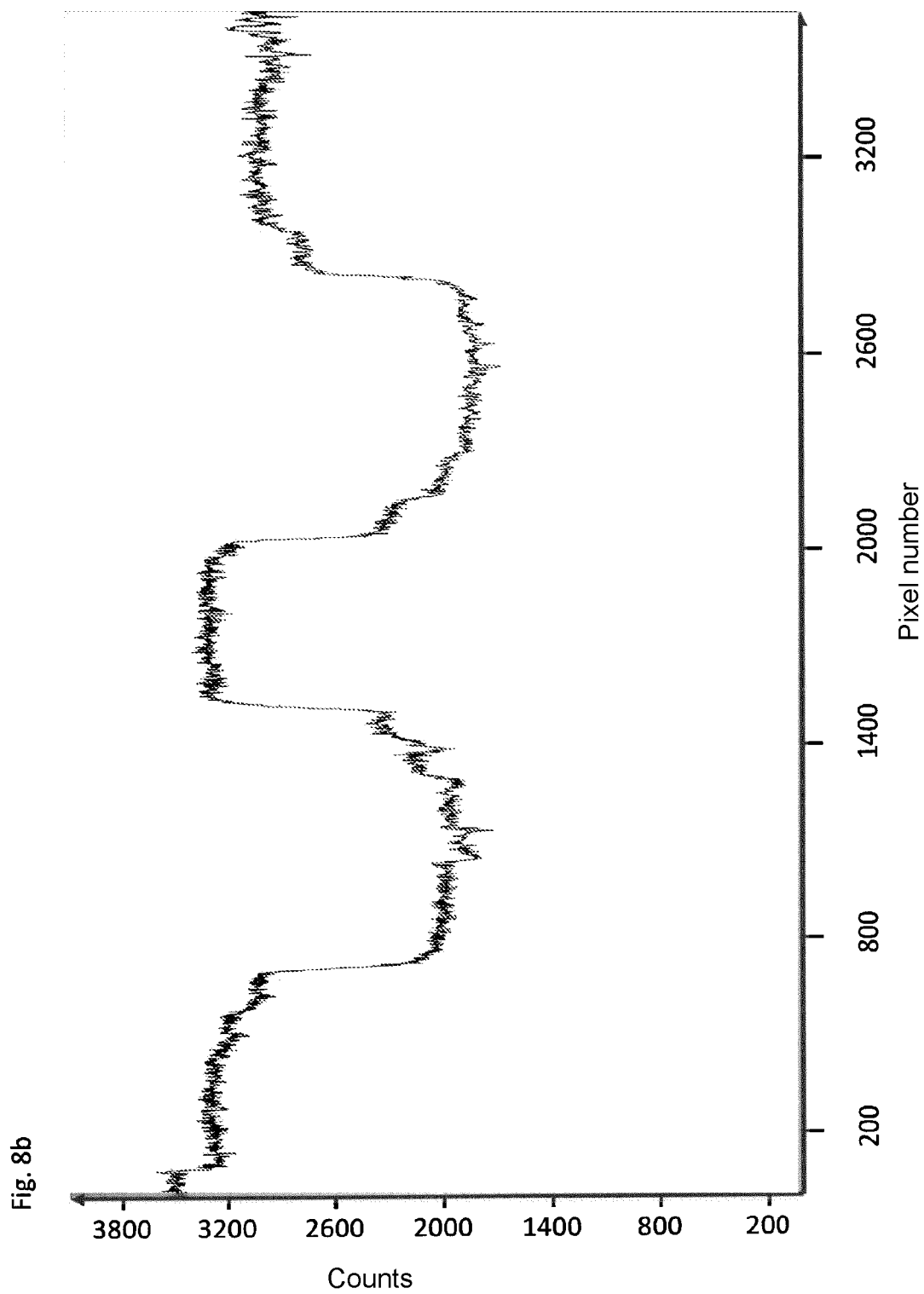

The second measuring device 120 is an optical measuring device. A possible and a preferred measurement configuration is shown in FIG. 8a, 8b. The second measuring device measures and references the position of the mouth region 56, 56' to the coordinate system of the laboratory automat. The position is uniquely defined in the coordinate system by a reference point x, y, z, which can, for example, correspond to the center of the tip of a reference mandrel. This reference mandrel simulates an ideal pipetting container and is over its entire length perfectly symmetrical to its longitudinal axis A ($\alpha=0°$). Inside the housing 121 of the second measuring device there is at least one light source emitting approximately collimated light and a line sensor (linear PDA, e.g. CCD or CMOS). The light source(s) is/are ideally point light sources (IR LEDs). If only one light source is implemented, its light is divided equally by means of suitable optical components, such that two equally powerful light sources are created. The light of the light sources is guided by mirrors and/or beam splitters in such a way that the mouth region 56, 56' to be measured is illuminated from two sides at an angle of about 60°. The light beams penetrating the sensor line form a light curtain whose plane is perpendicular to the z-axis.

For the correct determination of the position of an object ("object", FIG. 8a) located in the light curtain, the distances between the light sources and the orientation as well as the distance to the sensor line must be known in advance as accurately as possible. The system is designed in such a way that the ratio of the object diameter to be measured and the distance to the LED sensor line is large and the shadow diameters are not significantly larger than the measuring object diameter. An end region 52 of a pipetting container (or of a comparably shaped object) piercing this light curtain almost vertically then produces two shadows on the suitably long selected sensor line, as this is illustrated in FIG. 8a and shown enlarged as a measurement diagram in FIG. 8b. The positions of these shadows change, when the measurement object is moved in the plane of the light curtain. From the known positions of the LEDs and from the measured shadow centers on the sensor line, simple trigonometry can be used to calculate the point of intersection of the light beams through the center of the test object, i.e., for example, the mouth region of the pipetting container, and thus its position in the coordinate system, since the exact position of the measurement support section is also known from the measuring device 60. Now the relative position of the mouth portion 56 can be recorded by the control unit of the laboratory automat 100 in relation to the position of the measurement support section 54 and stored as relative position data in a data memory of the laboratory automat.

If subsequently the pipetting container 50 is picked up from a storage position in the working area known to the laboratory automat, the position of the mouth region can be determined by simply measuring the position, in particular the rotational position, of the pipetting container. Due to the information about the precise position of the mouth region, all subsequent program-controlled pipetting or dispensing operations can be performed very reliably by precise positioning of the mouth region 56, 56' relative to the sample container 99. This allows both free jet dispensing and wall dispensing to be carried out very precisely. Furthermore, the exact z-position of the end of an object to be measured, e.g. the described mouth region 57, 57', can also be determined, namely if the z-position of the robot device, at which the object to be measured touches the light curtain when coming from above, is determined when the position of the holding device or its supporting surface against which the pipetting container rests, is known.

FIG. 7a shows the free jet dispensing of a jet or of a drop 88 with a pipetting container 50, whose second end portion 52 and whose mouth region 56 are arranged coaxially with the first end portion 51. FIG. 7b shows the wall dispensing of a liquid volume 88 in a pipetting container 50', whose second end portion 52 and whose mouth region 56 are not coaxial with the first end portion 51. Rather, here the mouth portion 56' runs axially to an axis B, which is oriented at an angle to the axis A of the first end portion. This results in a distance d of the fluid exchange opening 57' from axis A, measured in the x-x plane perpendicular to axis A. Due to the different orientation of the first end portion and the mouth region 56', the pipetting container is particularly suitable for dispensing a liquid directly to the inner wall of the sample container 99, where the liquid adheres by adhesion or slides to the bottom of the container.

Figure 5A:
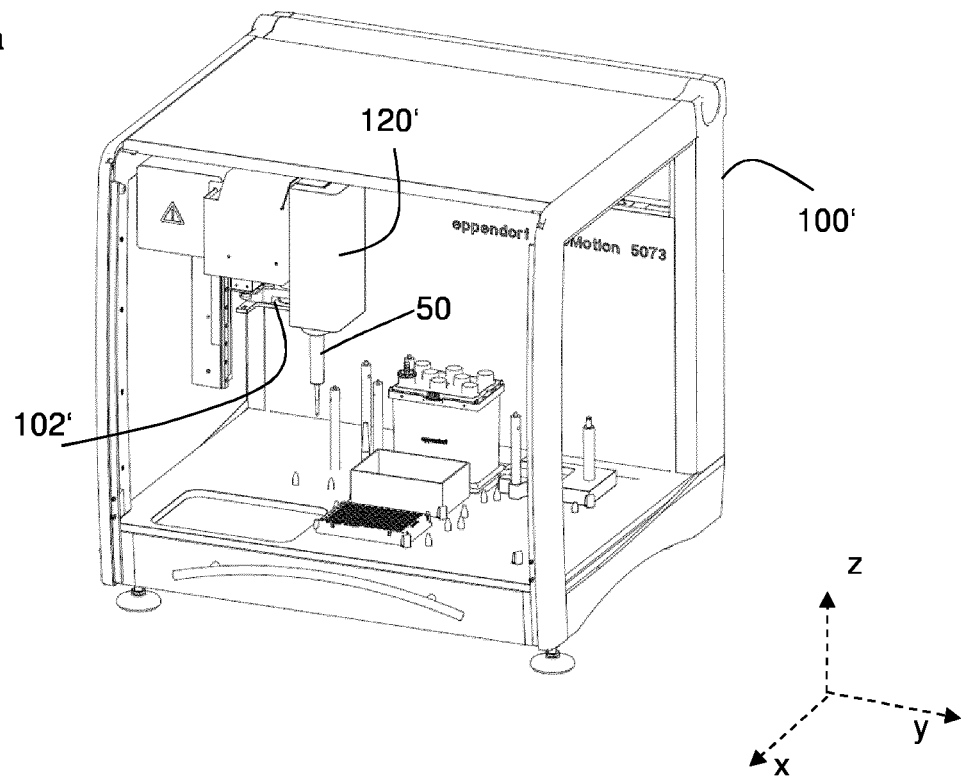
FIG. 5a shows, in a perspective view, another embodiment of an laboratory automat equipped with the measuring apparatus according to another preferred embodiment, in a first position of the second measuring device.
Figure 5B:
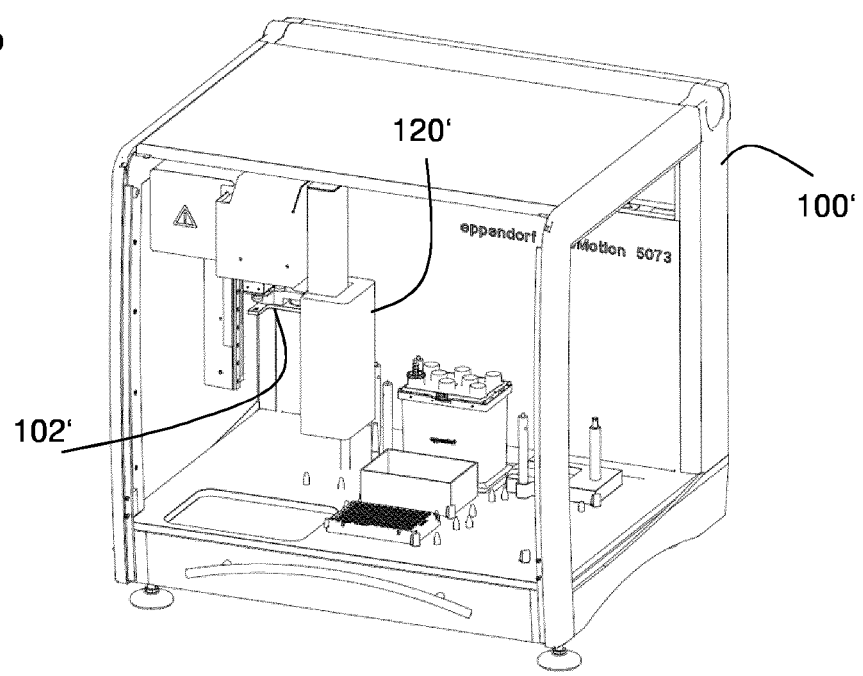
FIG. 5b shows, in a perspective view, the laboratory automat from FIG. 5a, in a second position of the second measuring device.

The FIGS. 5a and 5b show a preferred embodiment of the measuring apparatus in an laboratory automat 100'. Here the second measuring device 120' is movably mounted directly on the holding device 102', the movement along the z-axis can be controlled by the control device of the laboratory automat. If necessary, the measurement of the position of the mouth region (and the position measurement) can be carried out at any time without having to move to position 120a in the working area. FIG. 5a shows the starting position of the second measuring device 120', FIG. 5b shows a measuring position at which the second measuring device 120' frames the pipetting container 50.

FIG. 10 shows a multichannel pipetting container 150 arranged on the second measuring device 120, which has already been explained in FIG. 2 and which can be arranged in a laboratory automat 100 according to FIG. 4.

The multichannel pipetting container 150 is a multichannel dispensing container or a multichannel syringe, as it is in particular described in the patent application EP3260822A1. The multichannel pipetting container 150 comprises an object body 155 having a first end portion 151 and a second end portion 152, wherein the first end portion is adapted to connect the multichannel pipetting container to the connecting section 131 of the holding device 102 and comprises a measurement support section 154, and wherein the second end portion comprises an end region 156. The first end portion 151 runs along a longitudinal axis A, which also forms the axis of rotation around which the first end portion can be rotated at connection section 131. Means the measurement support section 154, the rotary position of the first end portion 151, in particular of the connecting section provided there, or of the multichannel pipetting container 150, around the axis of rotation can be determined by the measurement of the first measuring device.

The multi-channel dispensing container comprises a plurality M=8 of container bodies 152.1 ... 152.8 or syringe cylinders 152.1 ... 152.8, in each of which a cylinder piston is arranged in order to aspirate the liquid sample into the container body or to dispense the liquid sample from the container body step by step or as a whole by positive displacement. The eight-cylinder pistons are permanently coupled, such that they can be moved simultaneously under program control by a laboratory automat. The second end portion 152 is multipartite, it contains the eight container bodies. The end region 156 of the multichannel pipetting container 150 comprises the plurality of eight mouth regions 156.1 ... 156.8, whose positions can be detected as the position of the center of the mouth opening of a mouth region.

The relative position data acquired in the case of the multichannel pipetting container 150 contain an average value, which is acquired as follows:

The control device 3 of the measuring apparatus is here configured to move the end section 156 of the multichannel pipetting container along a horizontal direction of movement R, which coincides with the axis of the relative movement R between multichannel pipetting container and second measuring device. Thereby, each mouth region 156.*i* (i=1 . . . 8) of the end region 156 is successively moved into the measurement region located in the spatial region between the light source and the light sensor, and which is penetrated by the light curtain by means of which a shadow is created on the light sensor, which is finally measured.

In the present example of the measurement on the multichannel pipetting container 150 it is assumed that the control device 3 exactly knows the relative position of the longitudinal axes A1 . . . A8 of the container body in relation to the measurement support section.

In particular, the longitudinal axes A1 . . . A8 can run essentially parallel, in particular parallel to the longitudinal axis A of the multichannel pipetting container 150, which is in particular the axis of rotation with respect to which the first end section 151 takes up a rotational position relative to the holding device. However, it is also possible to measure the relative position of the longitudinal axes A1 . . . A8 (Ai) of the container bodies in relation to the measurement support section also with the second measuring device.

The measuring apparatus here is configured to record or to measure the positions of the several mouth regions 156.*i*, in particular of all mouth regions 156.*i*, of the end region 156 in relation to the measurement support section 154 by means of the second measuring device 120. The measuring apparatus comprises an evaluation device to evaluate the measurement of the positions of the several mouth regions 156.*i*, in particular to determine the relative position data from the recorded positions of the several mouth regions. The evaluation device is configured to derive a statistical value from the recorded positions (xi, yi) of the several mouth regions 156.*i*, which defines the relative position data. This statistical value may, in particular be a mean value, or preferably a range mean value.

The position measurement of a mouth region involves determining the position (xi, yi) of the mouth area 156.*i* in a plane—or of the position of the projection of the mouth region along the axis A onto this plane —, which is perpendicular to the longitudinal axes Ai of the container body and which runs through the straight line C on which the individual longitudinal axes Ai of the container body 152.*i* of the multichannel pipetting container 150 are lined up. The position of a mouth region is given as a point (xi, yi) of a Cartesian coordinate system Ki, whose origin is in particular the position of the longitudinal axis Ai in this plane and whose x-axis is the straight-line C. The relative position data to be stored could then include a mean value point (M_x, M_y), which is determined from the mean value M_x of the xi values and the mean value M_y of the yi values of the considered positions (xi, yi) of the mouth regions, wherein each of the positions (xi, yi) is defined with respect to the longitudinal axis Ai, which belongs to each respective container body, which determines the origin of each respective coordinate system. This mean value quantity can also be defined as a mean range value (W_x, W_y), wherein W_x is defined as the arithmetic mean of the largest value xi_max and the smallest value xi_min of all values xi, thus W_x=(xi_max−xi_min)/2 and whereas W_y is defined as the arithmetic mean of the largest value yi_max and the smallest value yi_min of all values yi, thus W_y=(yi_max−yi_min)/2.

The position measurement can be retraced using FIG. 11. In a first coordinate system K1 (bottom left), the position value (x1, y1) of the first mouth region 156.1 is entered, which deviates from the ideal case that would be given if the position value coincided with the origin, i.e. if it was located on the longitudinal axis A1 of the associated container body 152.1. In the further shown coordinate system K5 (center), the position value (x5, y5) of the fifth mouth region 156.5 is entered, which also deviates from the ideal case, which would be given if the position value coincided with the origin, i.e. was located on the longitudinal axis A5 of the associated container body. In the further coordinate system K8 (far right below) the position value (x8, y8) of the eighth mouth region 156.8 is entered, which also deviates from the ideal case, which would be given if the position value coincided with the origin, i.e. would be located on the longitudinal axis A8 of the associated container body. In the example all eight position values (xi, yi) are measured (here: successively, alternatively: simultaneously) and evaluated. If only the three position values (x1, y1), (x5, y5) and (x8, y8) shown here are considered, then the mean value (M_x, M_y) deviates from the range mean value (W_x, W_y), since W_y is approximately zero (W_y=0), while M_y deviates from zero. Assuming that here the two external values or extreme positions of the mouth areas 156. i are the values y1 and y8, then the acquisition of the mean range value W_y (and analogously W_x) offers the greatest certainty when positioning the multichannel pipetting container 150 over a series of sample holders of a multiple sample container—wherein this positioning uses the relative position data for position correction of the holding device or of the multichannel pipetting container 150—placing each mouth region 156.*i* within the assigned sample container. However, if the deviations of the positions 156.*i* from the longitudinal axis are sufficiently small, it can be assumed that a correction is not absolutely necessary in order to "hit" the sample receptacles and that even without position correction each mouth region lies within a sample receptacle. The acquisition of the mean value M_y (and analogue M_x) then offers the greatest average accuracy, when positioning the multichannel pipetting container 150 over a series of sample holders of a multiple sample container, to place the mouth areas 156.*i* as close as possible to the centers of the sample holders, for example, to possibly prevent wall dispensing.

If the individual deviation of one or more of the mouth regions 156.*i* from their axis Ai is too large to find a position for the entire multichannel pipetting container, so that during simultaneous liquid transfer still all target containers are filled, the laboratory automat can be configured such that a retaking of the container is carried out automatically or the use of the multichannel container is stopped.

The invention claimed is:

1. A measuring apparatus (1) for a liquid-handling laboratory automat for detecting the relative position of an end portion of a pipetting container (50; 50'), which consists partly or completely of plastic and serves to receive a fluid laboratory sample by means of suction into the pipetting container and/or to deliver the fluid laboratory sample and which pipetting container is automatically movable by the laboratory automat, the measuring apparatus comprising
a holding device (2) for holding the movable pipetting container (50; 50') comprising a tubular container body (55; 55') extending along a longitudinal axis A and having a first end portion (51; 51') and a second end portion (52; 52'), wherein the first end portion is adapted for connecting the pipetting container to the holding device and comprises a measurement support section (54; 54'), and wherein the second end portion comprises an end region (56; 56') being a mouth region with a fluid exchange opening,
an electronic control device (3) having data storage device (5) for storing data, a first measuring device (10; 60) which is arranged to measure a position of the measuring support section of the pipetting container on the holding device, a second measuring device (20; 120; 120') adapted to measure the position of the mouth region of the pipetting container, and the electronic control device of the measuring apparatus is configured and programmed to determine the position of a center of the mouth region being located at a perpendicular distance d>0 to the longitudinal axis A and to determine said position as a function of the position of the measurement support section as relative position data in the data storage device, so that subsequently the position of the mouth region of the pipetting container can be determined by measuring the position of the measurement support section and from the relative position data.

2. Measuring apparatus according to claim 1, comprising a base (6; 110) On which the second measuring device (20; 120) is placed, wherein the first measuring device is a component of the holding device (2), which holding device is movably supported on the base.

3. Measuring apparatus according to claim 1, wherein the first measuring device and the second measuring device are attached to the holding device (2) which is movably supported on a base (6; 110) of the measuring apparatus.

4. Measuring apparatus according to claim 1, wherein the second measuring device (20; 120; 120') comprises a measuring space, at least one light source and at least one light sensor for measuring the position of the end region (56; 56') of the pipetting container arranged in the measuring space.

5. Measuring apparatus according to claim 4, wherein the light sensor is a line sensor.

6. Measuring apparatus according to claim 4, wherein the light sensor is arranged for a spatially resolved measurement for detecting the shadowing of the light sensor, which shadowing arises when the pipetting container in the measuring space is introduced into the light path between the light source and the light sensor.

7. Measuring apparatus according to claim 1, wherein the first measuring device (10) is adapted to measure a rotational position of the measuring support section of the pipetting container on the holding device.

8. Liquid-handling laboratory automat for program-controlled treatment of at least one fluid laboratory sample (10), comprising the measuring apparatus according to claim 1.

9. Method (200) for detecting the relative position of a mouth region (56; 56') of a pipetting container (50; 50') extending along an axis A, which consists partly or completely of plastic and serves to receive a fluid laboratory sample by means of suction into the pipetting container and/or to deliver the fluid laboratory sample and which pipetting container comprises a tubular container body (55; 55') having a first (51; 51') and a second (52; 52') end portion, wherein the first end portion is adapted to connect the pipetting container to a holding device (2; 102; 102') and comprises a measurement support section (54; 54'), wherein the second end portion comprises the mouth region (56; 56'), comprising the steps of Measuring a position of the measuring support section of the pipetting container arranged on a holding device by means of a first measuring device; (201)

Measuring the position of a center of the mouth region being located at a perpendicular distance d>0 to the longitudinal axis A of the pipetting container placed on the holding device by means of a second measuring device; (202)

Saving the position of the mouth region as a function of the position of the measurement support section as relative position data in a data storage device, so that subsequently the position of the mouth region of the measured pipetting container can be determined by measuring the position of its measurement support section and from the relative position data (203).

10. Method according to claim 9 comprising the steps:

Placing the measured pipetting container (50; 50') in a storage position; (204)

Grasping the measured pipetting container (50; 50') again from the storage position and connecting the pipetting container to the holding device in a current position which deviates from the position of the pipetting container when it was measured, so that the position of the end region also deviates from the position when it was measured; (205)

Measuring the current position of the measured pipetting container (50; 50') by measuring the position of its measuring support section (54; 54') relative to the holding device (206)

Determining the position of the mouth region of the measured pipetting container from the current position of its measurement support section and from the stored relative position data (207).

* * * * *